(12) United States Patent
Hasegawa et al.

(10) Patent No.: US 7,247,113 B2
(45) Date of Patent: Jul. 24, 2007

(54) WORKING VEHICLE

(75) Inventors: Toshiyuki Hasegawa, Amagasaki (JP);
Atsuo Yoshina, Amagasaki (JP);
Shigenori Sakikawa, Amagasaki (JP)

(73) Assignee: Kanzaki Kokyukoki Mfg. Co. Ltd. (JP)

( * ) Notice: Subject to any disclaimer, the term of this patent is extended or adjusted under 35 U.S.C. 154(b) by 0 days.

(21) Appl. No.: 11/105,794

(22) Filed: Apr. 14, 2005

(65) Prior Publication Data

US 2005/0192148 A1   Sep. 1, 2005

Related U.S. Application Data

(62) Division of application No. 10/340,983, filed on Jan. 13, 2003, now Pat. No. 6,918,850.

(30) Foreign Application Priority Data

Jan. 18, 2002  (JP)  ............................. 2002-010386
Nov. 18, 2002  (JP)  ............................. 2002-333771

(51) Int. Cl.
*F16H 47/04*  (2006.01)
*F16D 33/00*  (2006.01)

(52) U.S. Cl. .......................................... 475/78; 60/440

(58) Field of Classification Search ............. 475/72–74, 475/78, 83; 60/439, 440, 441; 74/718, 720, 74/404, 404.5
See application file for complete search history.

(56) References Cited

U.S. PATENT DOCUMENTS

| 5,403,241 | A  | 4/1995 | Jarchow et al. |
| 5,667,452 | A  | 9/1997 | Coutant |
| 5,890,981 | A  | 4/1999 | Coutant et al. |
| 6,190,280 | B1 | 2/2001 | Horsch |
| 6,565,471 | B2 | 5/2003 | Weeramantry et al. |
| 2003/0136591 | A1 | 7/2003 | Kitasaka et al. |

FOREIGN PATENT DOCUMENTS

| JP | 02-54634 | 4/1990 |
| JP | 05-56555 | 7/1993 |
| JP | 07-255230 | 10/1995 |
| JP | 2000-320644 | 11/2000 |
| JP | 20001-105906 | 4/2001 |
| JP | 02003184990 A | 7/2003 |

*Primary Examiner*—Roger Pang
(74) *Attorney, Agent, or Firm*—Wood, Phillips, Katz, Clark & Mortimer

(57) ABSTRACT

In a working vehicle, a variable output HST and a planetary gear unit are connected with an engine, which is supported on a vehicle frame closer to a first side of a fore and aft direction of the vehicle in vibration free manner so as to together constitute a driving-side unit, which is integrally supported on the vehicle frame in vibration free manner. A transmission case of a transmission is fixedly supported on the vehicle frame closer to a second side of the fore and aft direction of the vehicle with a distance from the driving-side unit. An output element of the planetary gear unit is operatively connected with a wheel drive train of the transmission via a shaft coupling extending along the fore and aft direction of the vehicle.

2 Claims, 19 Drawing Sheets

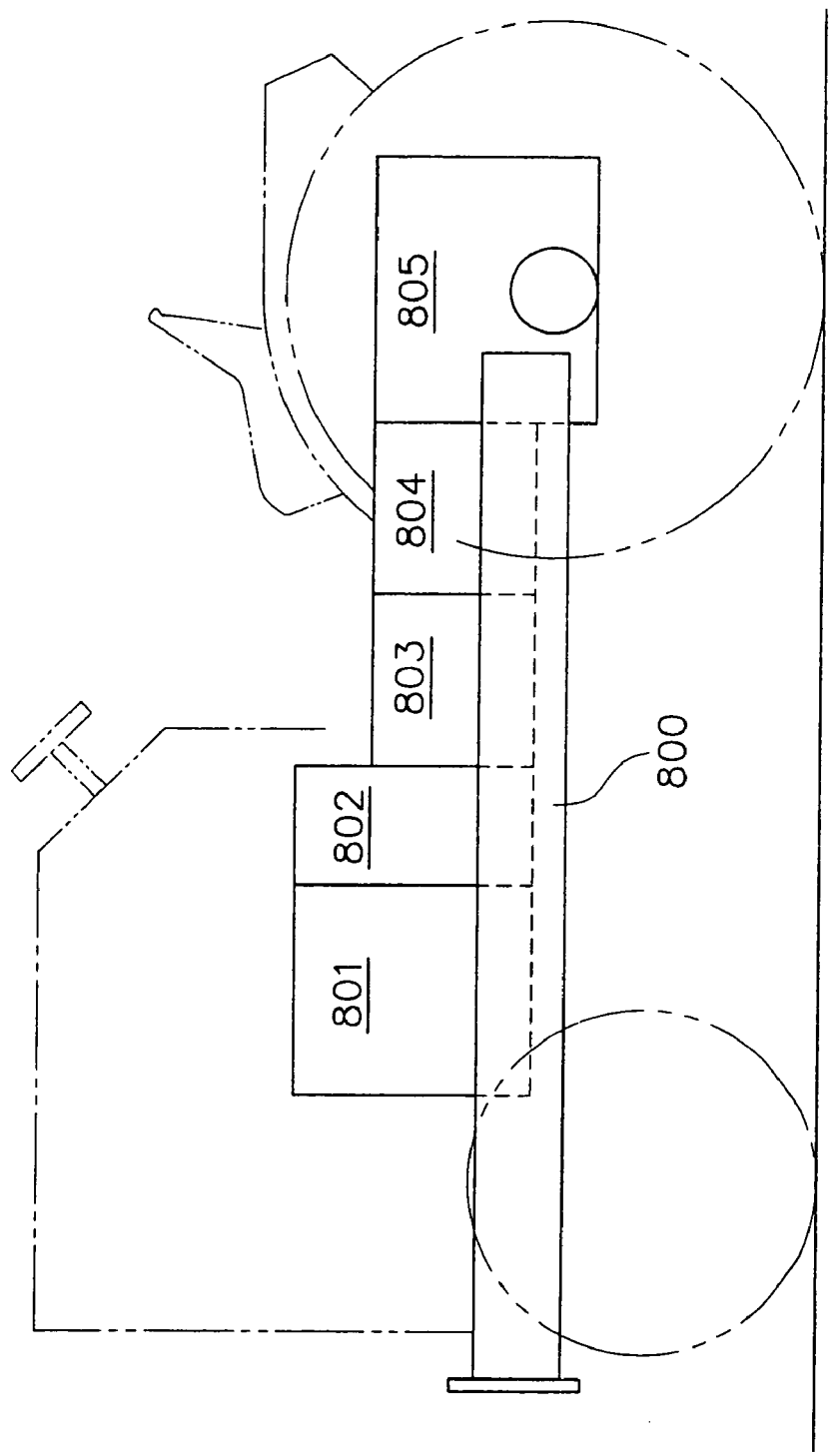

WORKING VEHICLE

CROSS-REFERENCE

This application is a division of Ser. No. 10/340,983, filed Jan. 13, 2003 now U.S. Pat. 6,918,850, entitled "Working Vehicle".

BACKGROUND OF THE INVENTION

1. Field of the Invention

The present invention relates to a working vehicle with a transmission arrangement that transmits drive power from an engine to a drive axle.

2. Related Art

A vehicle such as a working vehicle is designed so as to transmit drive power from an engine to a drive axle via a speed change unit, enabling the drive axle to be rotated at a desired speed by operating the speed change unit. Where it is desired to widen a speed change range of the drive axle, and/or reduce the load applied to the speed change unit, a sub-speed change unit is provided in addition to a main-speed change unit.

FIG. 19 illustrates a model view of a conventional vehicle with the main- and sub-speed change units provided and a rear axle serving as the drive axle. As illustrated in FIG. 19, aligned in the conventional vehicle equipped with the sub-speed change unit from a first side to a second side relative to a fore and aft direction of the vehicle are engine 801, flywheel 802, main-speed change unit 803, sub-speed change unit 804 and driving axle unit 805, which are connected in tandem in such a manner as to be separable from each other. This specific arrangement may cause a problem as mentioned below.

In the conventional vehicle with the sub-speed change unit, the independent units, that is, the engine 801, the flywheel 802, the main-speed change unit 803, the sub-speed change unit 804 and the axle unit 805 respectively have housings, through which they are connected in tandem, resulting in generating substantially no space between front and rear wheels. This causes a need to mount a step bar or board for the driver's seat above either of the housings, which arrangement causes the step bar or board to be mounted at a higher position, and or all of the housings to be mounted at a higher place in case where a mid-mount mower is provided between the front and rear wheels, thus undesirably inviting a higher center of gravity.

Also, in the conventional arrangement, where an HST (Hydro-static transmission) is used as the main-speed change unit 803, the HST itself vibrates due to pulsation or the like of working fluid circulated therein. This vibration of the HST may be transmitted to vehicle frame 800 via the sub-speed change unit 804 and the axle unit 805 because the main-speed change unit 803, the sub-speed change unit 804 and the axle unit 805 are connected in tandem, as described above. As a result, the ride quality of the vehicle may be deteriorated.

To address the above problems, there has been proposed an arrangement where the engine is connected with the sub-speed change unit through a housing, and the HST serving as the main-speed change unit is connected with a front side of the sub-speed change unit via a vibration absorbing member, while a front side of the HST is connected with the housing via another vibration absorbing member. However, in this arrangement, vibration of the engine is not taken into account at all. Accordingly, there cause a problem that the housing itself, which supports the HST through the vibration absorbing arrangement, vibrates due to vibration transmitted from the engine.

According to need and/or desire, the working vehicle is equipped with a hydraulic lift unit for lifting a working implement. Hitherto, the hydraulic lift unit is mounted on an upper side of a transmission case of a transmission or inside of the transmission case. In this arrangement, load generated when the working implement is moved upward or downward is applied on the transmission case. For this reason, the transmission case must be strengthened in this conventional arrangement.

In order to address the above problems, it is an object of the present invention to provide a working vehicle with a transmission arrangement transmitting drive power from the engine to the drive axle via the main- and sub-speed change units, which is capable of widening the speed change range of the drive axle and/or reducing load of a speed change mechanism, as well as effectively limiting expansion of the vehicle's length while securing a free space between the front and rear wheels.

It is another object of the present invention to provide a working vehicle that is capable of effectively preventing transmission of vibration from the engine, the main-speed change unit or the like to the transmission, the axle or the like, thus avoiding discomfort to the driver of the vehicle.

It is still another object of the present invention to provide a working vehicle equipped with a hydraulic lift unit for moving a working implement relative to the vehicle frame, which is capable of reducing the load to the transmission case, which is generated by the movement of the working implement.

It is yet another object of the present invention to provide a working vehicle equipped with an HMT made up by the combination of a variable output HST and a planetary gear unit, which is capable of minimizing the size of the HST, and widening the running speed changing range, while easily producing freewheel state of the driving wheels.

SUMMARY OF THE INVENTION

According to one aspect of the present invention, there is provided a working vehicle, which includes a vehicle frame; an engine supported in vibration free manner on the vehicle frame closer to a first side of a fore and aft direction of the vehicle; a variable output HST having an input shaft and an output shaft, the input shaft being operatively connected with the engine; a planetary gear unit including first to third elements comprising a sun gear, a planetary carrier and an internal gear, in which the first element and the second element of the three elements are respectively operatively connected with the input shaft and the output shaft of the HST; and a transmission including a transmission case and a drive train for driving wheels, the drive train being placed within the transmission case and including a forward/rearward travel direction changing unit. In this arrangement, the HST and the planetary gear unit are connected with the engine so as to together constitute a driving-side unit; the transmission case is fixedly supported on the vehicle frame closer to a second side of the fore and aft direction of the vehicle with a distance from the driving-side unit; and the third element of the planetary gear unit is operatively connected with the drive train of the transmission via a coupling shaft for a running-power transmission path, which extends along the fore and aft direction of the vehicle.

Preferably, the transmission further includes a power take-off drive train being placed within the transmission case for taking off of drive power for a working implement, and the input shaft of the HST is operatively connected with the power take-off drive train via a shaft coupling for a working-implement drive train, which extends along the fore and aft direction of the vehicle. More preferably, the shaft coupling for the running-power transmission path is a vibration absorbing shaft coupling.

According to another aspect of the present invention, there is provided a working vehicle equipped with a hydraulic lift unit for moving a working implement, which is to be attached to the working vehicle, relative to a vehicle frame, in which the vehicle frame includes a pair of main frames that extend in the fore and aft direction of the vehicle on the opposite lateral sides thereof and a cross member located closer to a first side of a fore and aft direction of the vehicle in such a manner as to straddle the pair of main frames; and the hydraulic lift unit is supported by the cross member.

Preferably, the vehicle frame further includes a ROPS support frame, the ROPS support frame including a pair of vertical extensions respectively connected with the pair of main frames, and an upper plate for connection between upper ends of the pair of vertical extensions. More preferably, the ROPS support frame further includes a bottom plate for connection between lower ends of the pair of vertical extensions; and a tow-bar storage box, into which a tow bar is inserted, is secured to the bottom plate.

Preferably, the vehicle frame further includes a reinforcing frame having a gate-like shape and being connected between the pair of main frames; and the reinforcing frame has opposite lateral side wall portions, to which loader masts are attachable, and top wall portions, to which a handle column is attachable.

According to still another aspect of the present invention, there is provided a working vehicle comprising an HMT made up by the combination of an HST and a planetary gear unit, and a forward/rearward travel direction changing unit for changing the rotational direction of output of the HMT, the HMT and the forward/rearward travel direction changing unit being arranged in tandem in a power transmission path extending from a driving source to driving wheels. The HST includes a hydraulic pump unit and a hydraulic motor unit, at least one of which being designated as being of a variable displacement type, a pump shaft being operatively connected with the driving source for driving the hydraulic pump unit and a motor shaft being driven by the hydraulic motor unit, wherein an HST variable output in both forward and reverse directions is outputted via the motor shaft. The HMT is designed to be held in a substantially output shutdown mode during the HST variable output is at a maximum level in either forward or reverse direction, and switched from the substantially output shutdown mode to a maximum output mode as the HST variable output is changed from the maximum output level in the either forward or reverse direction to a maximum output level in the opposite direction. The forward/rearward travel direction changing unit is designed to shut off the power transmission path during the HMT is held in the substantially output shutdown mode, thereby enabling the driving wheels to be brought into freewheel state.

In one embodiment of the working vehicle having the above arrangement, the forward/rearward travel direction changing unit is designed to bring the driving wheels into freewheel state automatically, when the HMT has been brought into the output shutdown mode. In another embodiment, the forward/rearward travel direction changing unit is designed to bring the driving wheels into freewheel state by the operation from the outside, when the HMT has been brought into the output shutdown mode.

Preferably, the HMT is located closer to a first side of a fore and aft direction of the vehicle frame and connected with the driving source that is supported in vibration free manner relative to the vehicle frame, thereby constituting a driving-side unit in cooperation with the driving source; and the forward/rearward travel direction changing unit is placed within a transmission case, the transmission case being fixedly supported on the vehicle frame closer to a second side of the fore and aft direction of the vehicle frame with a distance from the driving-side unit.

According to yet another aspect of the present invention, there is provided a working vehicle comprising an HMT made up by the combination of an HST and a planetary gear unit, and a forward/rearward travel direction changing unit for changing the rotational direction of output of the HMT, the HMT and the forward/rearward travel direction changing unit being arranged in tandem in a power transmission path extending from a driving source to driving wheels. The HST includes a hydraulic pump unit and a hydraulic motor unit, at least one of which being designated as being of a variable displacement type, a pump shaft being operatively connected with the driving source for driving the hydraulic pump unit and a motor shaft being driven by the hydraulic motor unit, wherein an HST variable output in both forward and reverse directions is outputted via the motor shaft. The HMT is designed to be held in a substantially output shutdown mode during the HST variable output is at a maximum level in either forward or reverse direction, and switched from the substantially output shutdown mode to a maximum output mode as the HST variable output is changed from the maximum output level in the either forward or reverse direction to a maximum output level in the opposite direction. The forward/rearward travel direction changing unit is interposed between the driving source and the HMT with respect to a power transmission direction, and designed to be switched into a forward travel mode enabling transmission of drive power from the driving source to the pump shaft with the rotational direction of the drive power maintained in a forward direction, a rearward travel mode enabling drive power from the driving source to the pump shaft with the rotational direction of the drive power changed to a reverse direction, and a neutral mode shutting off a power transmission path from the driving source to the pump shaft.

Preferably, the driving source, the forward/rearward travel direction changing unit and the HMT together constitute a driving-side unit that is supported in vibration free manner relative to a vehicle frame.

In one embodiment of the above working vehicle, the forward/rearward travel direction changing unit is designed to be capable of selecting a normal operation, in which the forward/rearward travel direction changing unit is switched into respectively the forward travel mode, the rearward travel mode and the neutral mode when an operation member is shifted into a forward travel position, a rearward travel position and a neutral position by a driver, and a power neutral operation, in which the forward/rearward travel direction changing unit is switched into respectively the forward travel mode and the rearward travel mode when the operation member is shifted into the forward travel position and the rearward travel position by the driver, and switched into either the forward travel mode or the rearward travel mode when the operation member is shifted to the neutral position.

BRIEF DESCRIPTION OF THE DRAWINGS

The above, and other objects, features and advantages of the present invention will become apparent from the detailed description thereof in conjunction with the accompanying drawings wherein.

FIG. 19 is a schematic side view of the conventional working vehicle.

DETAILED DESCRIPTION OF THE PREFERRED EMBODIMENT

First Embodiment

Figure 1:
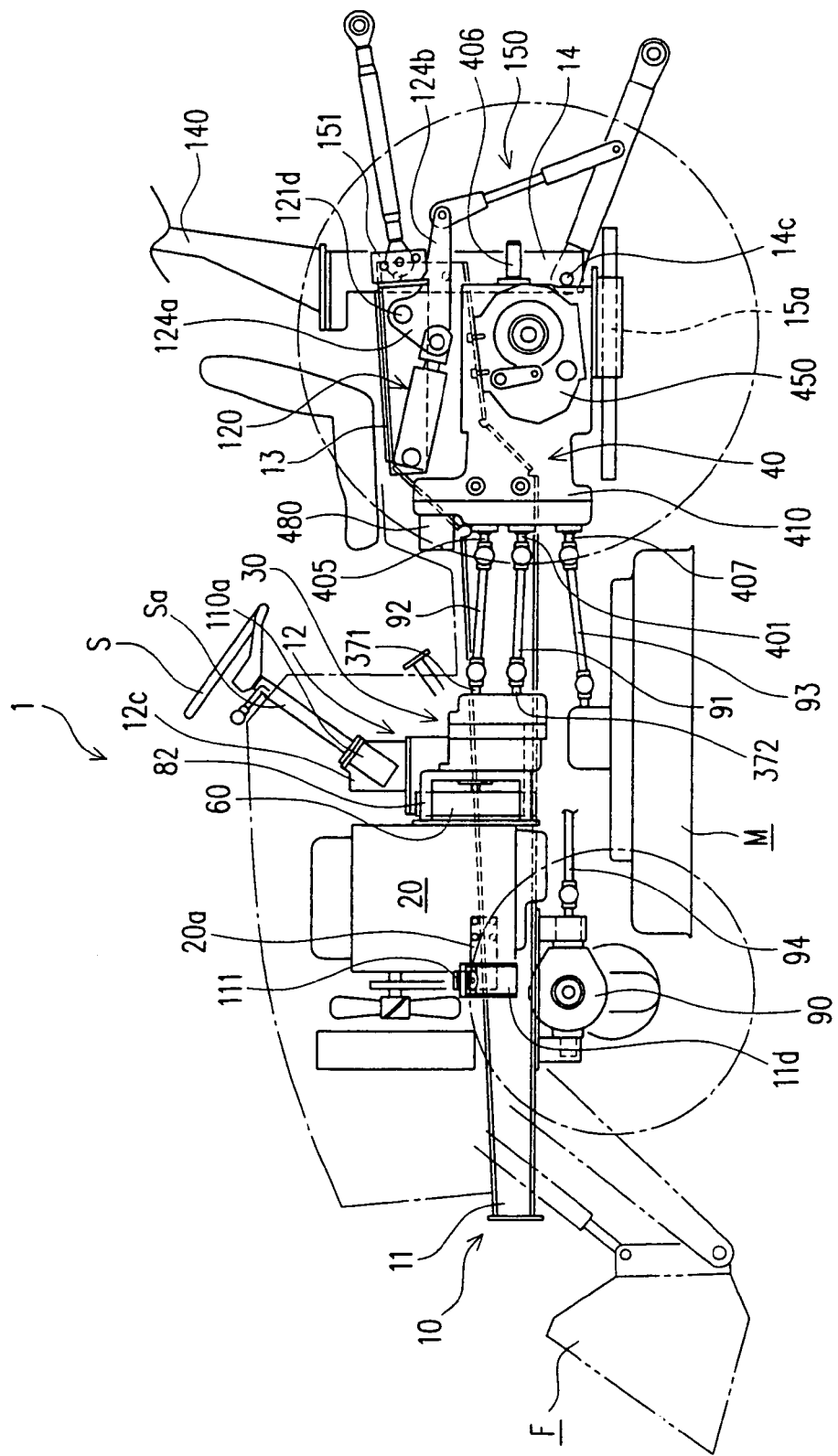
FIG. 1 is a schematic side view of a working vehicle according to one embodiment of the present invention.
Figure 2:
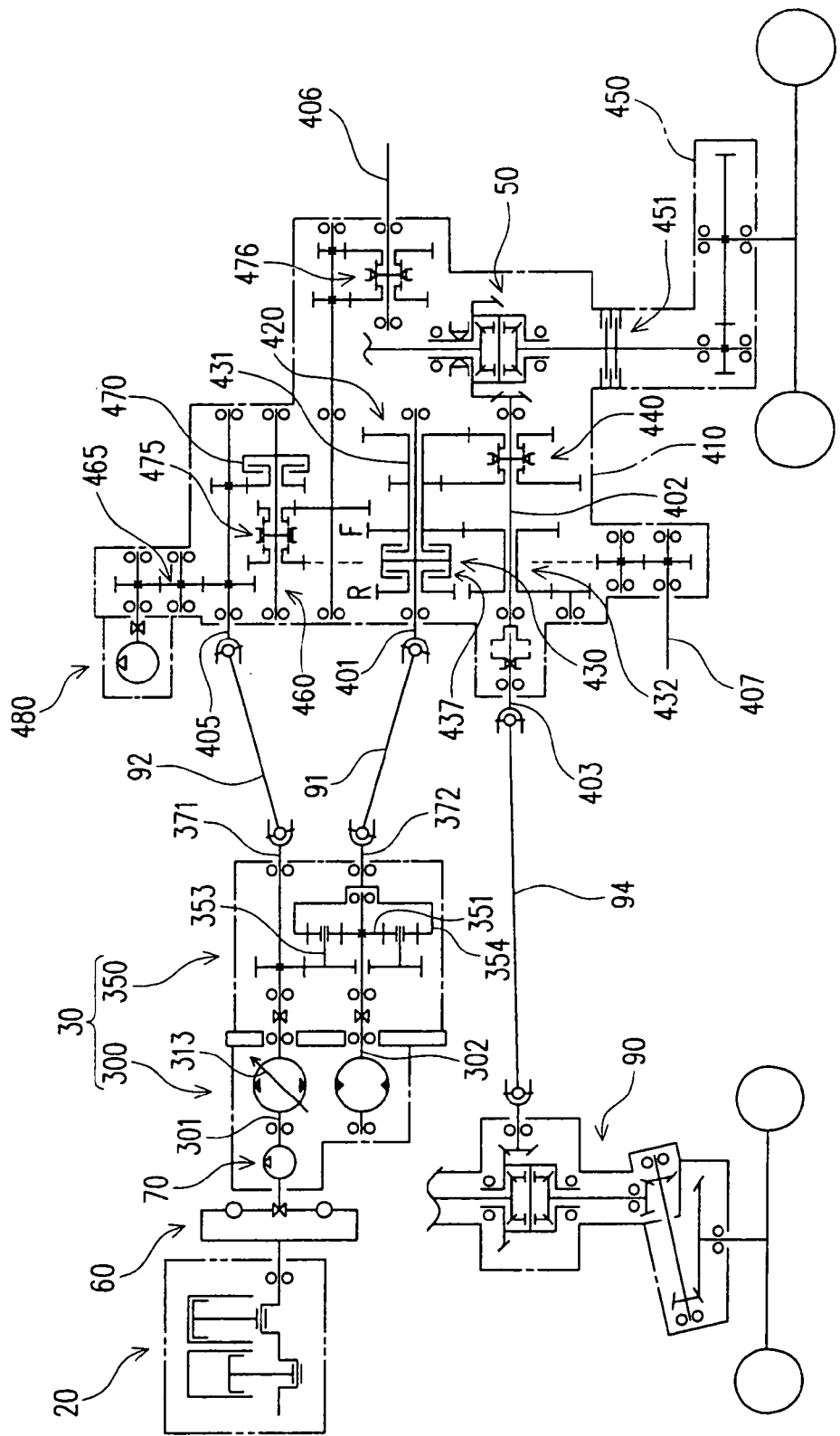
FIG. 2 is a model view of a power transmission path of the working vehicle as illustrated in FIG. 1.

The description will be made for the first embodiment of the present invention with reference to the accompanied drawings. FIGS. 1 and 2 are respectively a schematic side view of working vehicle 1 according to this embodiment and a model view of its power transmission path.

As illustrated in FIGS. 1 and 2, the working vehicle 1 includes vehicle frame 10, engine 20 supported on the vehicle frame 10 closer to a first side of the fore and aft direction of the vehicle in vibration free manner, main-speed change unit 30 for changing the speed of drive power from the engine and transmitting the same to a downstream unit, and transmission 40 for driving the drive axle upon receiving output of the main-speed change unit. As illustrated in FIG. 2, the working vehicle 1 includes an HMT (Hydro- mechanical transmission) unit made up by the connection of HST 300 with planetary gear unit 350.

Figure 3:
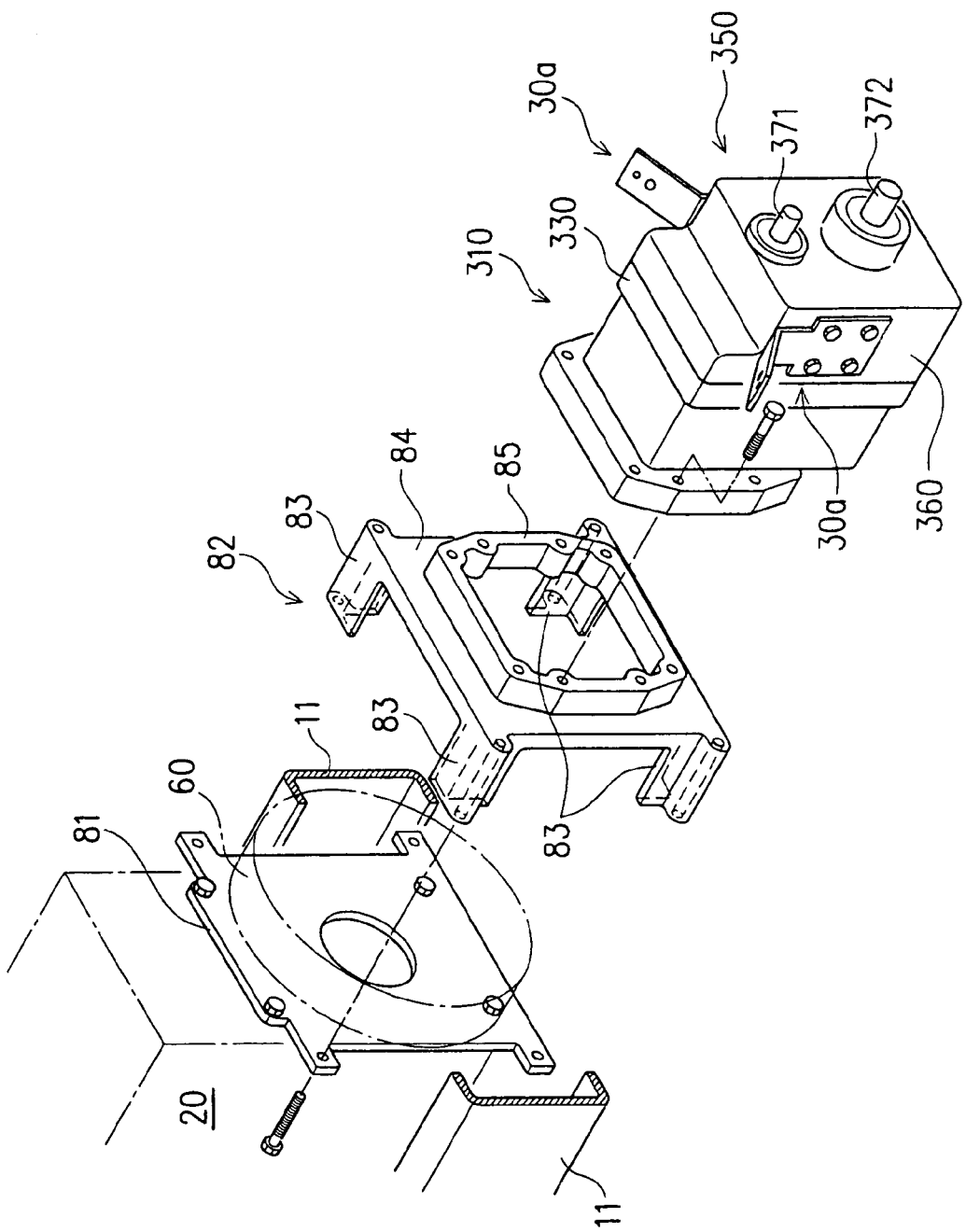
FIG. 3 is an exploded perspective view of an engine and an HMT in the working vehicle of FIG. 1.

FIG. 3 is an exploded perspective view of the engine as viewed from the rear side. As illustrated in FIGS. 1 and 3, the vehicle frame 10 includes a pair of main frames 11 extending in the fore and aft direction of the vehicle on the opposite lateral side thereof, while the engine 20 is supported on the pair of main frames 11 in vibration free manner.

Specifically, the engine 20 is of the horizontal type with an engine output shaft extending along the fore and aft direction of the vehicle. The engine 20 has a crank case and is provided with bracket 20a secured to a forward lower portion of a side wall of the crank case via rubber cushion 111 so that the engine is supported through the bracket 20a and the rubber cushion 111 on the pair of main frames 11, thus preventing transmission of vibration from the engine 20 to the vehicle frame 10.

Figure 4:
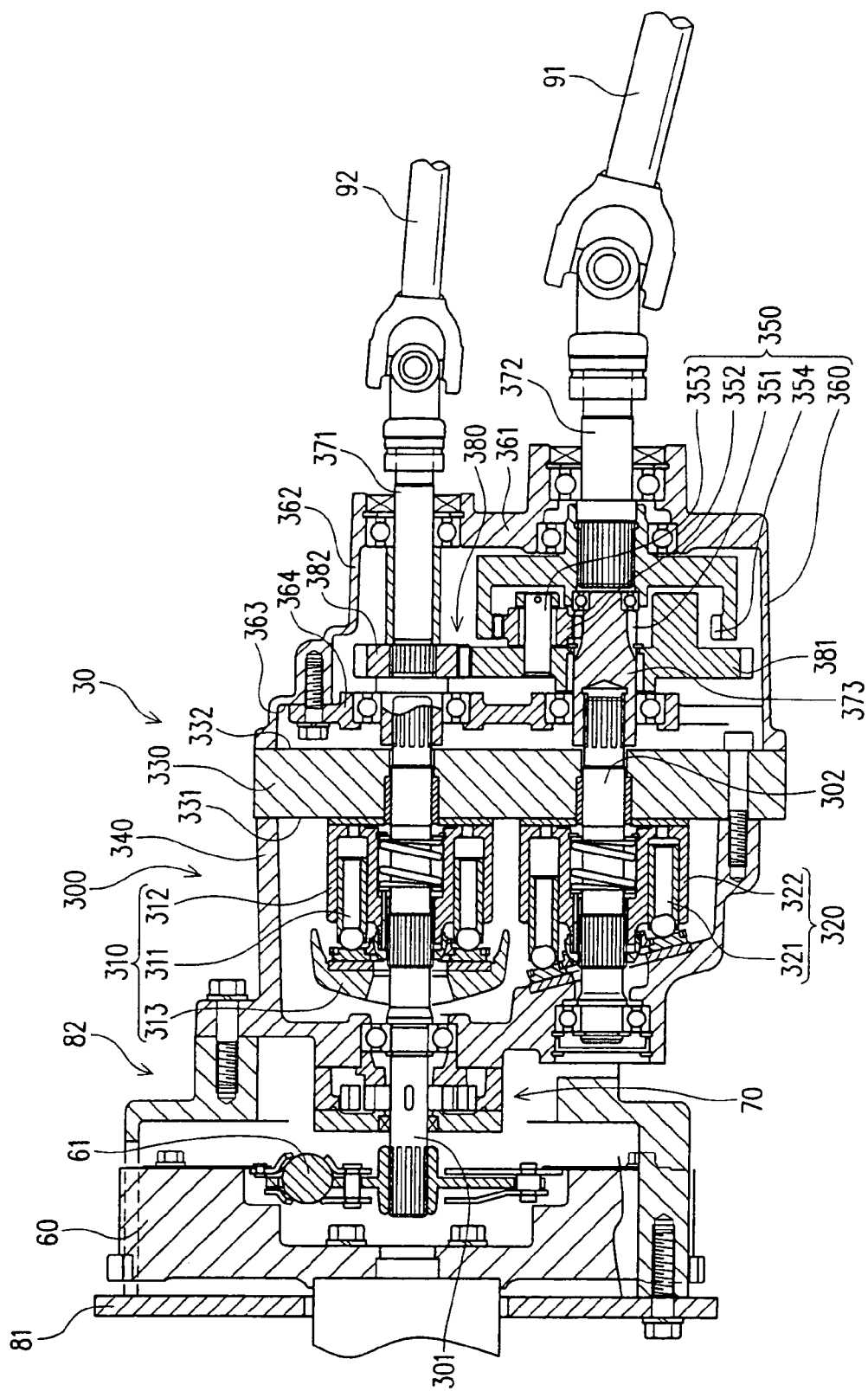
FIG. 4 is a longitudinal cross-sectional side view of the HMT in the working vehicle of FIG. 1.

FIG. 4 is a longitudinal cross-sectional side view of the HST 300, the planetary gear unit 350, and their proximity. The HST 300 includes input shaft (pump shaft) 301 for receiving drive power from the engine 20 via flywheel 60, hydraulic pump unit 310 being driven by the input shaft 301, hydraulic motor unit 320 for non-stepwisely changing the speed of drive power from the engine 20 in cooperation with the hydraulic pump unit 310, output shaft (motor shaft) 302 being rotated by the hydraulic motor unit 320, center section 330 for supporting the hydraulic pump unit 310 and the hydraulic motor unit 320, as well as forming therein a hydraulic circuit enabling fluid connection therebetween, and HST case 340 being connected with the center section 330 so as to enclose the hydraulic pump unit 310 and the hydraulic motor unit 320. In this embodiment, the center section 330 forms therein a pair of hydraulic lines serving as the hydraulic circuit, as will be described hereinafter.

At least one of the hydraulic pump unit 310 and the hydraulic motor unit 320 is of a variable displacement type that enables variation in the inflow/outflow amounts of hydraulic fluid through the operation of an output adjustment member. Specifically, the slant angle of the output adjustment member is controlled so that drive power with its speed non-stepwisely changed according to the slant angle can be outputted from the motor shaft 302, which is driven by the hydraulic motor unit 320. In this embodiment, the hydraulic pump unit 310 and the hydraulic motor unit 320 are respectively designated as being of the variable displacement type and a fixed displacement type.

The center section 330 has first side 331 and second side 332 respectively facing the upstream and downstream sides of the power transmission direction, in which the first side 331 supports thereon both the hydraulic pump unit 310 and the hydraulic motor unit 320. The HST case 340 is connected with the first side 331, thereby enclosing the hydraulic pump unit 310 and the hydraulic motor unit 320.

As used throughout the description, the directional term "upstream" and "downstream" are relative to the power transmission direction.

The input shaft 301 is rotatably supported by the center section 330 and the HST case 340 so as to have an upstream end extending upstream from the HST case 340, and a downstream end extending downstream through the center section 330. Thus, the input shaft 301 has a rotational axis extending in the fore and aft direction of the vehicle.

The upstream end of the input shaft 301 is operatively connected with the engine 20 via the flywheel 60. The flywheel 60 may be provided with damper 61, which enables power transmission to the subsequent units, that is, the HST 300 and the planetary gear unit 350 which constitutes an HMT in cooperation with the HST 300, while limiting the variation in angular speed of the engine output shaft.

The hydraulic pump unit 310 includes piston unit 311 that is rotated around the axis of the input shaft 301 by the rotation of the input shaft 301 and reciprocatingly moved in association with this rotational movement, cylinder block 312 that reciprocatingly supports the piston unit 311, while being rotatably and slidably supported on the first side 331 of the center section 330 so as to be communicated with the pair of hydraulic lines, and output adjustment member 313 that limits the stroke length of the piston unit 311 through its slant angle, thereby varying the suction/discharge rate of the piston unit 311. The slant angle of the output adjustment member 313 is controlled by a hereinafter mentioned hydraulic control unit.

In this embodiment, the hydraulic pump unit 310 is designated as being of an axial piston type, and therefore a movable swash plate is employed as the output adjustment member 313. Therefore, where a hydraulic pump unit of a radial piston type is employed, a cam ring is employed as the output adjustment member.

The hydraulic motor unit 320, which is designated as being of the fixed displacement type in this embodiment, includes cylinder block 322 that is rotatably and slidably supported on the first side 331 of the center section 330 so as to be communicated with the pair of hydraulic lines, and piston unit 321 that is slidably supported within the cylinder block 322, while being reciprocated and simultaneously rotated upon receiving pressurized hydraulic fluid from the pair of hydraulic lines, thereby transmitting this rotational movement to the output shaft.

The output shaft 302 is supported by the HST case 340 and the center section 330 so as to have a downstream end extending through the center section 330 to the outside (rearwards in this embodiment), and has the rotational axis in the fore and aft direction of the vehicle so as to be in parallel relationship with the input shaft 301.

The working vehicle 1 is also provided on the front side of the HST case 340 with charge pump unit 70 that is driven through the upstream end of the input shaft 301, as illustrated in FIGS. 2 and 4. The charge pump unit 70 is used for supplying working fluid to the HST 30 and the hydraulic control unit that controls the output adjustment member.

The planetary gear unit 350 includes sun gear 351, planetary carrier 353 that supports planetary gear 352, which is meshed with the sun gear 351, enabling the planetary gear 352 to be rotated around its axis, and that is rotated by the orbital motion of the planetary gear 352, internal gear 354 meshed with the planetary gear 352, and planetary housing 360 connected with the second side 332 of the center section 330 so as to enclose these gears.

Of three elements of the planetary gear unit 350, that is, the sun gear 351, the planetary carrier 353 and the internal gear 354, first and second elements are respectively connected with the input shaft 301 and the output shaft 302 of the HST 300, while running power to be transmitted to the driving wheels is taken off from a third element.

In this embodiment, the planetary carrier 353, the sun gear 351 and the internal gear 354 respectively correspond to the first to third elements.

In this embodiment, the planetary gear unit 350 is provided with PTO output shaft 371 and running-power output shaft (HMT output shaft) 372 respectively disposed coaxial with the HST input shaft 301 and the HST output shaft 302. The PTO output shaft 371 is supported by the planetary housing 360 so as to have an upstream end connected with the HST input shaft 301 in a non-rotatable manner around the axis, and a downstream end protruding from the planetary housing 360 to the downstream side.

More specifically, the planetary housing 360 includes end wall portion 361 on the downstream side (a rear wall portion in this embodiment) and peripheral wall portion 362 extending upstream from a peripheral edge of the end wall portion 361, and has an upstream side (a forward side in this embodiment), which is opened to the outside. Integrally formed with the peripheral wall portion 362 of the planetary housing 360 is boss portion 363, which radially inwardly extends from an inner peripheral surface of the peripheral wall portion 362. Bearing plate 364 is attached to the boss portion 363 via screws.

The PTO output shaft 371 is rotatably supported by the bearing plate 364 and the end wall portion 361 so as to have an upstream end protruding upstream from the bearing plate 364 and a downstream end protruding downstream from the end wall portion 361. The upstream end of the PTO output shaft 371 is provided with a spline coupling, into which the downstream end of the input shaft 301 relatively non-rotatably protrudes.

Also, supported on the bearing plate 364 is running-power intermediate shaft 373 disposed coaxial with the HST output shaft 302 and connected with the HST output shaft 302 in such a manner as to be relatively non-rotatable around its axis. The running-power intermediate shaft 373 has an upstream end that is provided with a spline coupling, into which the downstream end of the HST output shaft 302 relatively non-rotatably protrudes. A portion of the running-power intermediate shaft 373, which is located on the downstream side of the bearing plate 364, is provided with the sun gear 351 serving as the second element.

Transmission gear 381 is relatively rotatably supported on a portion of the running-power intermediate shaft 373, which is located on the downstream side of the bearing plate 364. The transmission gear 381 constitutes a part of gear train 380 which operatively connect the PTO output shaft 371 or the HST input shaft 301 and the planetary carrier 353 serving as the first element. Specifically, fixed gear 382 is relatively non-rotatably supported on a portion of the PTO output shaft 371, which is located on the downstream side of the bearing plate 364, so as to be meshed with the transmission gear 381. The planetary carrier 353 is connected with the transmission gear 381 so as to enable the planetary gear 352 to orbit around the sun gear 351 by the rotation of the transmission gear 381.

The running-power output shaft 372 has an upstream end relatively non-rotatably connected with the internal gear 354 serving as the third element, and a downstream end relatively rotatably supported on the end wall portion 361 so as to protrude downstream from the planetary housing 360. The running-power output shaft 372 serves as the HMT output shaft.

With the above arrangement, a simplified assembling operation, which involves only attaching the upstream opening of the planetary housing 360 to the second side 332 of the center section 330 after assembling the planetary gear unit 350, enables operative connection of the planetary carrier 353 with the HST input shaft 301, operative connection of the sun gear 351 with the HST output shaft 302, and taking off of the PTO drive power having a constant speed of rotation and the running-power having a variable speed of rotation respectively through the downstream ends of the PTO output shaft 371 and the running-power output shaft 372.

As described above, in this embodiment, the HMT, which is made up by the combination of the HST 300 and the planetary gear unit 350, is employed as the main-speed change unit 30 arranged in the running-power transmission path. Thus, it is possible to widen the speed change range of the output of the HST while not causing increase in volume of the HST, and omit the necessity to provide a sub-speed change unit to be arranged in the running-power transmission path, or minimize the speed change range of a provided sub-speed change unit so as to reduce the number of speed stages at the sub-speed change unit.

Figure 5:
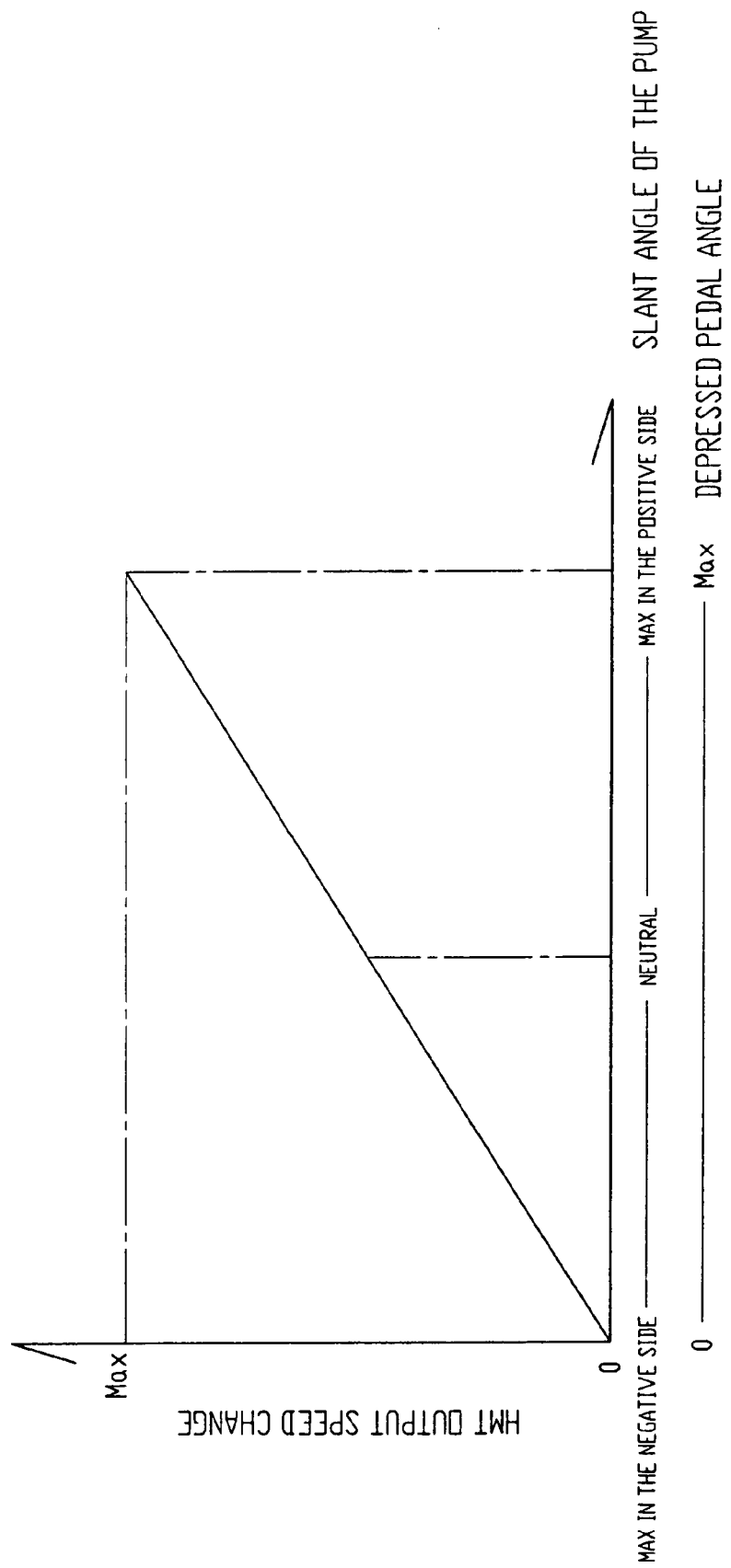
FIG. 5 is a graph showing the relationship between slant angle of an output adjustment member in the HST and rotational speed of an output shaft of the HMT.

FIG. 5 illustrates the relationship between the slant angle of the output adjustment member 313 in the HST 300 (the movable swash plate in this embodiment) and the rotational speed of the HMT output shaft (the running-power output shaft 372 in this embodiment).

As illustrated in FIG. 5, the HMT 30 of this embodiment is so designed as to be held in a substantially output shutdown mode during the HST 300 is at a maximum output level in either forward or reverse direction (the reverse rotation in FIG. 5), while being held in a maximum output mode during the HST 300 is at a maximum output level in the opposite direction (the forward rotation in FIG. 5). That is, the HMT 30 is only capable of driving the running-power output shaft 372 from 0 to the maximum speed of the vehicle by the rotation in a single direction, thus avoiding increase in size of the HST 300. The travel direction of the vehicle is changed from forward to reverse or vice versa by a later described geared forward/reverse travel direction changing unit, thereby expanding twice the running speed change range covering the forward travel and the reverse travel of the vehicle.

With the above arrangement, even where the output of the HST output shaft 302 is zero (that is, the HST 300 is held in a neutral mode), running power is outputted from the HMT 30. Therefore, during the output adjustment member 313 (the movable swash plate) of the HST 300 is held in the neutral mode, the power transmission path from the engine to the driving wheels can be kept in a condition in which drive power is mechanically transmitted with high efficiency.

Now, the description will be made for a mounting structure of the HMT 30.

The HMT 30 is fixedly connected with the engine 20 which is supported to the vehicle frame 10 in vibration free manner, thereby constituting along with the engine 20 a driving-side unit which can be freely vibrated against the vehicle frame 10.

That is, the driving-side unit constituted by the connection of the engine 20 with the HMT 30 is supported via rubber cushions 111 to four rubber-cushioned brackets 11*d*, which are secured to the pair of main frames 11 closer to the front side of the pair of main frames 11 with spacing from each other in the fore and aft direction of the vehicle, and each two of the four brackets being located on each lateral side of the vehicle frame.

More specifically, the part of the engine 20 of the driving-side unit is supported on the rubber-cushioned brackets 11*d* via brackets 20*a* secured to the opposite lateral sides of the crank case closer to front lower side and the rubber cushions 111.

On the other hand, the part of the HMT 30 of the driving-side unit is supported on the rubber-cushioned brackets 11*d* via brackets 30*a* secured to the opposite lateral sides of the planetary housing 360 and rubber cushions (not shown), as illustrated in FIG. 3.

The vibration free support of the driving-side unit relative to the vehicle frame can effectively prevent vibration of the engine 20, and vibration of the HST itself due to pulsation of working fluid circulating within the HST 300 or any other causes from transmitting to the vehicle frame 10, hence preventing deterioration in ride quality due to the thus generated vibration.

Specifically, the HMT 30 is connected with the engine 20 via HMT mounting member 80, which includes mounting flange 81 attached to the rear side of the crank case of the engine 20 and HMT mounting block 82 attached to the mounting flange 81.

The HMT mounting block 82 includes four legs 83 extending upright from the mounting flange 81, and vertically oriented side portion 84 extending between downstream ends of the legs 83. The four legs 83 are arranged so as to have the outer circumference of the flywheel 60 exposed to the outside from a phantom line that connects the adjacent legs. Thus, in this embodiment, instead of a conventional flywheel housing, which is of the type that entirely covers the flywheel 60, the HMT mounting block 82 is used so as to minimize the distance between the pair of main frames 11 in the width direction thereof.

The vertically oriented side portion 84 is provided with mounting flange 85, which forms a central opening, which allows the HST input shaft 301 to be inserted therethrough and the charge pump unit 70 to be placed therein. A front wall of the HST case 340 is attached to the mounting flange 85.

Now, the description will be made for the transmission 40.

The transmission 40 includes transmission case 410, running-power input shaft 401 supported by the transmission case 410 so as to have an upstream end extending outwards, running-power output shaft 402 for outputting drive power to the front wheels and/or rear wheels, and wheel drive train 420 for transmitting drive power from the running-power input shaft 401 to the running-power output shaft 402, as illustrated in FIG. 2.

Figure 6:
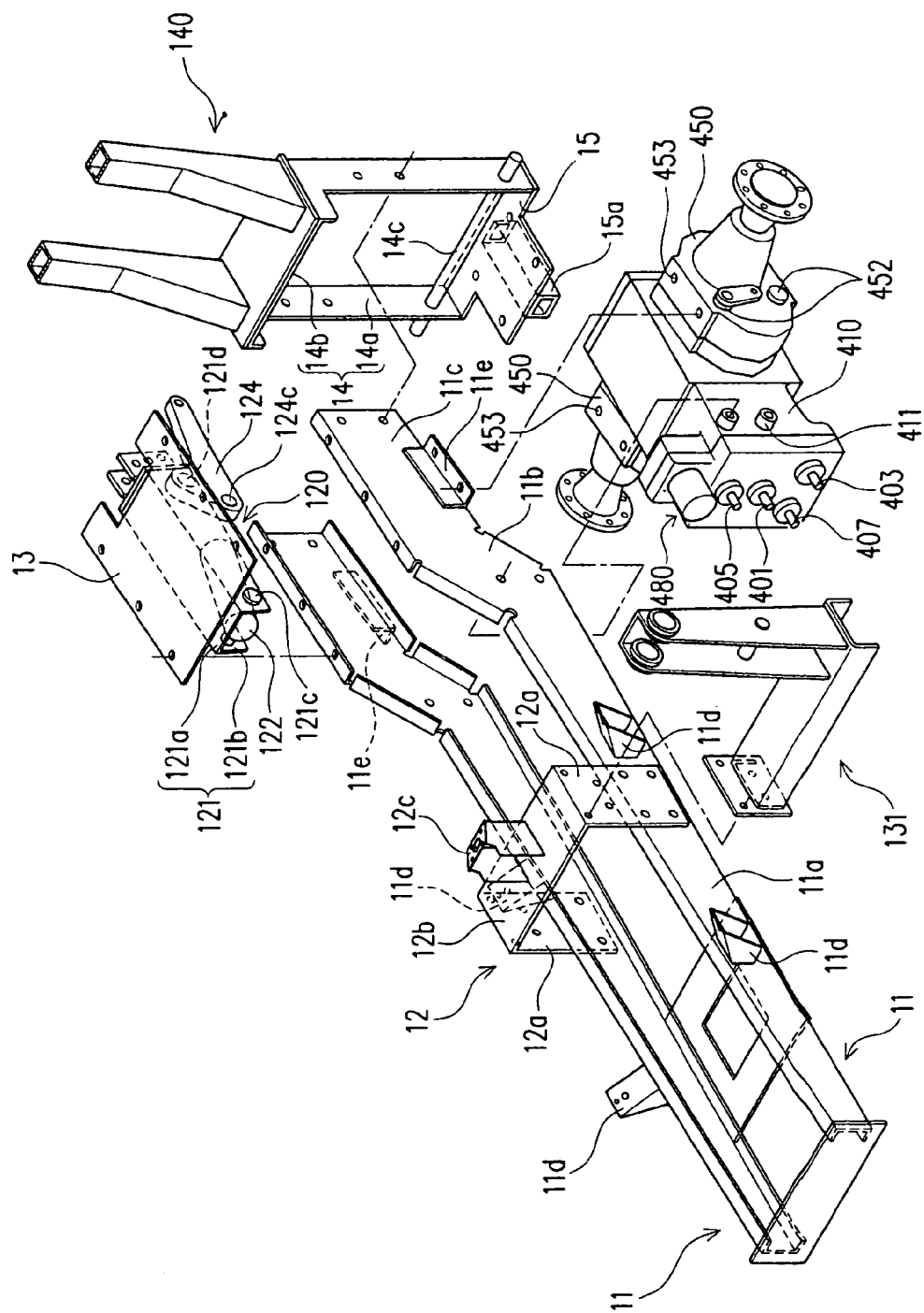
FIG. 6 is an exploded perspective view of a part of the vehicle frame in the working vehicle of FIG. 1.

FIG. 6 is an exploded perspective view of the vehicle frame 10 and the transmission 40. As illustrated in FIGS. 1 and 6, the transmission case 410 is fixedly supported on the pair of main frames 11 closer to the second side of the fore and aft direction of the vehicle with a distance from the driving side unit. On the opposite lateral sides of the transmission case 410 are provided rear axle housings 450, each of which contains axle brake unit 451 (see FIGS. 2 and 6).

Preferably, the rear axle housings 450 have an identical structure so as to be applicable to the opposite lateral sides of the transmission case 410. In this embodiment, each rear axle housing 450 is provided with bosses 452 on upper and lower portions of its lateral side for supporting brake arm 451, which is to control a corresponding one of the brake units 451, and on top and bottom sides with mounting bosses 453 for mounting to the pair of main frames 11 (see FIG. 6).

Reference numeral 411 in FIG. 6 represents a mounting boss formed on the opposite lateral sides of the transmission case 410 closer to the front end thereof for mounting to the pair of main frames 11. Reference numerals 11*e* in FIG. 6 represent transmission mounting brackets respectively secured to the opposite outer sides of the pair of main frames 11 closer to the rear ends thereof so as to be placed and secured to upwardly facing ones of the mounting bosses 453 of the rear axle housing 450.

The running-power input shaft 401 is operatively connected with the running-power output shaft 372 of the planetary gear unit 350 via shaft coupling 91, which extends along the fore and aft direction of the vehicle as slanting downward towards the rear side. Preferably, a vibration absorbing coupling with universal joints provided at the opposite ends is employed as the shaft coupling 91.

The wheel drive train 420 includes forward/rearward travel direction changing unit 430 for changing the output direction (rotational direction) of the running-power output shaft 402 relative to the running-power input shaft 401. More specifically, the wheel drive train 420 includes a power transmission path for the forward travel, which transmits power during the forward travel, and a power transmission path for the rearward travel, which transmits power during the rearward travel. The forward/rearward travel direction changing unit 430 includes a hydraulically actuated clutch so as to be capable of being shifted to a forward travel position for selecting the power transmission path for the forward travel (that is, a mode enabling direct engagement of driven shaft 431 with the running-power input shaft 401), a rearward travel position for selecting the power transmission path for the rearward travel (that is, a mode enabling engagement between the running-power input shaft 401 and the driven shaft 431 via an idle gear), and a freewheel position for shutting off both the power transmission paths of the wheel drive train 420 (that is, a mode shutting off the power transmission relationship between the HMT output and the driving wheels) and bringing the driving wheels into freewheel state.

In this embodiment, although the wheel drive train 420 is provided with two-speed geared sub-speed change unit 440 between the driven shaft 431 of the forward/rearward travel direction changing unit 430 and the running-power output shaft 402, this sub-speed change unit can be omitted in case where the main-speed change unit (HMT) can output running power with its speed change range covering the regular speed of the vehicle.

Thus, the working vehicle of this embodiment, in which the driving-side unit is constituted by connecting the HMT 30 serving as the main-speed change unit with the engine 20, which is supported on the vehicle frame 10 closer to the first side of the fore and aft direction of the vehicle in vibration free manner; the transmission case 410 is fixedly supported on the vehicle frame 10 closer to the second side of the fore and aft direction of the vehicle with a distance from the driving-side unit; and the running-power output shaft (HMT output shaft) 372 of the planetary gear unit 350 is connected with the running-power input shaft 401 of the transmission 40 via the shaft coupling 91, secures a free space substantially in the center of the vehicle frame 10 with respect to the fore and aft direction of the vehicle without expanding the vehicle length. The free space thus secured achieves improved design flexibility for arranging such as a step bar or board of the driver's seat and a mid-mount mower.

If the shaft coupling 91 is designated as being of a vibration absorbing type, it is possible to securely achieve power transmission from the driving-side unit to the transmission 40, while more effectively preventing vibrations of the driving-side unit from transmitting to the transmission 40.

Reference numeral 403 in FIGS. 2 and 6 represents a front-wheel-driving-power-take-off-shaft, which is operatively connected via a clutch with the running-power output shaft 402 so as to be capable of turning on and off transmission of power and is connected via shaft coupling 94 extending towards the front side of the vehicle frame 10 with front axle unit 90 suspended by a portion of the vehicle frame 10 closer to the front side thereof. Reference numeral 50 in FIG. 2 represents a differential gear unit operatively connected with the running-power output shaft 402 for connecting the right and left rear wheels together, enabling the wheels to revolve at different speeds.

In this embodiment, the transmission 40 further includes PTO input shaft 405 supported on the transmission case 410 so as to have an upstream end extending outwards, drive train 460 for taking off drive power for the working implement (hereinafter referred to as "working-implement PTO drive train") 460, which transmits drive power inputted into the PTO input shaft 405, rear-PTO shaft 406 protruding rearwards of the vehicle, mid-PTO shaft 407 running under the vehicle, and sub-pump unit 480.

The PTO input shaft 405 is operatively connected with the PTO output shaft 371 of the planetary gear unit 350 via shaft coupling 92, which extends along the fore and aft direction of the vehicle as slanting downward towards the rear side. With this arrangement, the working vehicle 1 of this embodiment can secure a free space substantially in the center of the vehicle frame 10 with respect to the fore and aft direction of the vehicle without expanding the vehicle length, although it is provided with the drive train for the working implement.

Preferably, the shaft coupling 92 is designated as being of a vibration absorbing type, which includes universal joints at the opposite ends, thereby more effectively preventing vibrations of the drive-side unit from transmitting to the transmission 40.

The working-implement PTO drive train 460 includes sub-pump-unit-drive gear train 465 for transmitting power from the PTO input shaft 405 to the sub-pump unit 480, hydraulic PTO clutch unit 470 for engaging and disengaging power from the PTO input shaft 405 to the mid-PTO shaft 407 and the rear-PTO shaft 406 in an area downstream of the sub-pump-unit-drive gear train 465, and switching mechanism 475 for selectively switching the power transmission path of drive power transmitted from the PTO input shaft 405 to the mid-PTO shaft 407 only, the rear-PTO shaft 406 only, or both the mid-PTO shaft 407 and the rear-PTO shaft 406 in an area downstream of the hydraulic PTO clutch unit 470.

The drive power transmission path of the rear-PTO shaft 406 is provided with two-speed rear PTO speed change unit 476 on the downstream side of the switching mechanism 475. As illustrated in FIG. 6, the front-wheel-driving-power-take-off-shaft 403 and the mid-PTO shaft 407 respectively have outward extensions extending from the front lower side of the transmission case so as to be disposed in lateral side-by-side relationship. The mid-PTO shaft 407 is connected with a mower attached to the bottom of the vehicle via shaft coupling 93.

The sub-pump unit 480 is driven by the sub-pump-unit-drive gear train 465 located on the upstream side of the hydraulic PTO clutch unit 470, as described above. Therefore, the sub-pump unit 480 is constantly driven when the engine runs.

Figure 7:
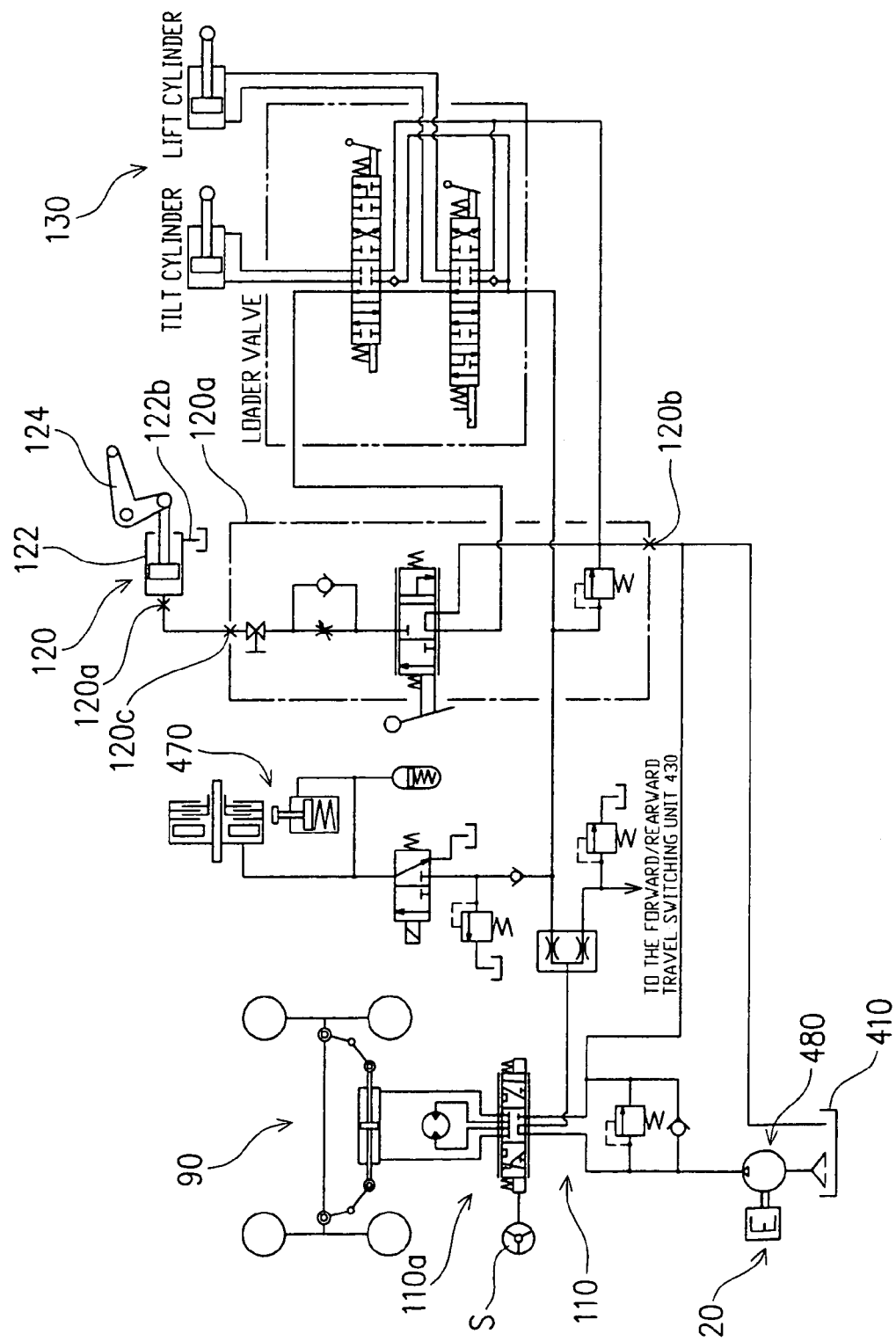
FIG. 7 is a hydraulic circuit diagram of an auxiliary pump unit in the working vehicle of FIG. 1.

FIG. 7 is a hydraulic circuit diagram of the sub-pump unit 480.

The sub-pump unit 480 is located on the transmission case 410, as described above, and is in an integral relationship with the vehicle frame 10. Accordingly, the sub-pump unit 480 does not serve as a hydraulic source for the HST 300, which is integrally vibrated with the engine, but a hydraulic source for hydraulic equipment, which is in an integral relationship with the vehicle frame 10.

That is, the sub-pump unit 480 serves as a hydraulic source for front-wheel power steering unit 110 provided in the vehicle according to desire or need, the hydraulic PTO clutch unit 470 equipped with a negative brake mechanism, the forward/rearward travel direction changing unit 430, hydraulic lift unit 120 provided in the vehicle according to desire or need in order to lift the working vehicle attached to the rear side of the vehicle, hydraulic supply unit 130 of a front loader F equipped on the front side of the vehicle according to desire or need, and the like.

In this embodiment, pressurized hydraulic fluid supplied from the sub-pump unit 480 is first supplied to the front-wheel power steering unit 110 and drain fluid therefrom is then divided into the forward/rearward travel direction changing unit 430 and other hydraulic equipment by means of a flow dividing valve. In this regard, it is to be noted that the hydraulic circuit of the present invention is not necessarily limited to this, but rather it can take various arrangements.

Now, the description will be made for the vehicle frame 10 of the working vehicle according to this embodiment.

The vehicle frame 10 includes the pair of main frames 11 extending in the fore and aft direction of the vehicle on the opposite lateral side thereof, as described above. As illustrated in FIG. 6, the pair of main frames 11 respectively have first horizontal portions 11*a*, slanting portions 11*b* slanting upward from the first ends in the fore and aft direction of the vehicle (the rear ends in this embodiment), second horizontal portions 11*c* which extend horizontally from the first ends of the slanting portions 11*b* in the fore and aft direction of the vehicle (the rear ends in this embodiment), thus forming a substantially Z-shape as viewed from the lateral side (or substantially reverse Z-shape). The slanting portions 11*b* and the second horizontal portions 11*c* are placed over the connected member comprising the transmission case 410 and the rear axle housing 450 so as to support the connected member, in which the connected member also serves as a cross member for the pair of main frames.

The vehicle frame 10 further includes reinforcing frame 12 having a gate-like shape and connected between the pair of main frames 11. In this arrangement, the reinforcing frame 12 also serves as a cross member. The reinforcing frame 12 is preferably disposed substantially in the center of the first horizontal portions 11*a* in the fore and aft direction thereof to straddle over the flywheel 60, the HST 300 and the like.

More specifically, the reinforcing frame 12 has a pair of lateral side wall portions 12*a* respectively connected with the pair of main frames 11, and top wall portion 12*b* extending between the pair of lateral side wall portions 12*a*. Front loader masts 131 are attachable to upper portions of the opposite lateral side wall portions 12*a*. Substantially in the lateral center of the top wall portion 12*b* is provided pedestal 12*c* for installing controller 110*a* for the front-wheel power steering unit 110, handle column Sa for supporting handle S, and the like. Further, it is possible to provide a stay secured to the reinforcing frame 12 so as to enable peripheral parts such as a dashboard panel to be attached to the frame. The reinforcing frame 12 is made of a steel plate in this embodiment but may be made from cast metal when the bending strength is to be increased.

The vehicle frame 10 further includes top plate 13 disposed straddling over top sides of the pair of main frames 11 so as to serve as a cross member. The top plate 13 is designed to be capable of suspending and supporting the hydraulic lift unit 120, and preferably located above and in proximity with the transmission 40. In this embodiment, the top plate 13 is disposed straddling over the top sides of the second horizontal portions 11*c* of the pair of main frames 11.

Figure 8:
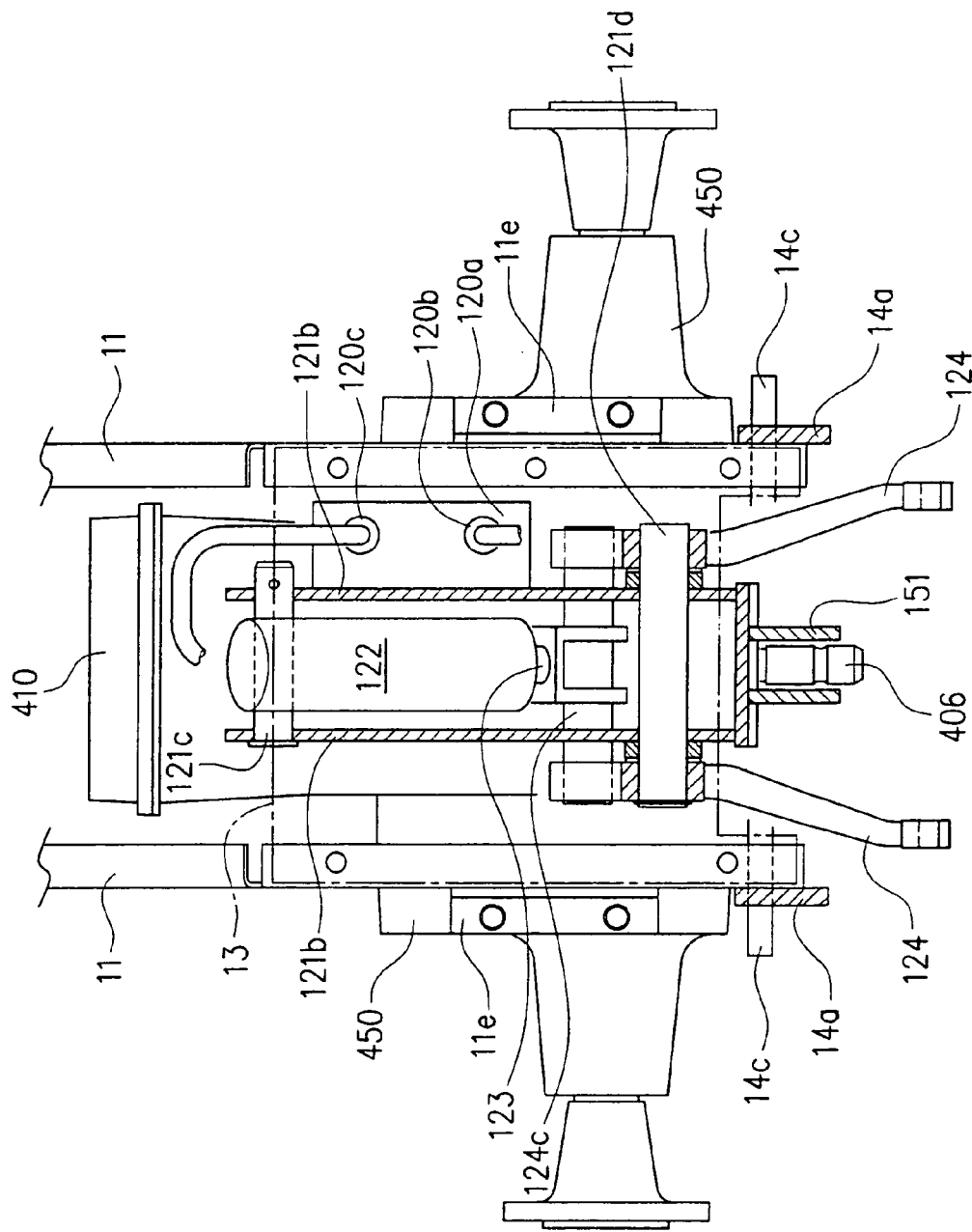
FIG. 8 is a plan view of a hydraulic lift unit and its proximity in the working vehicle of FIG. 1.
Figure 9:
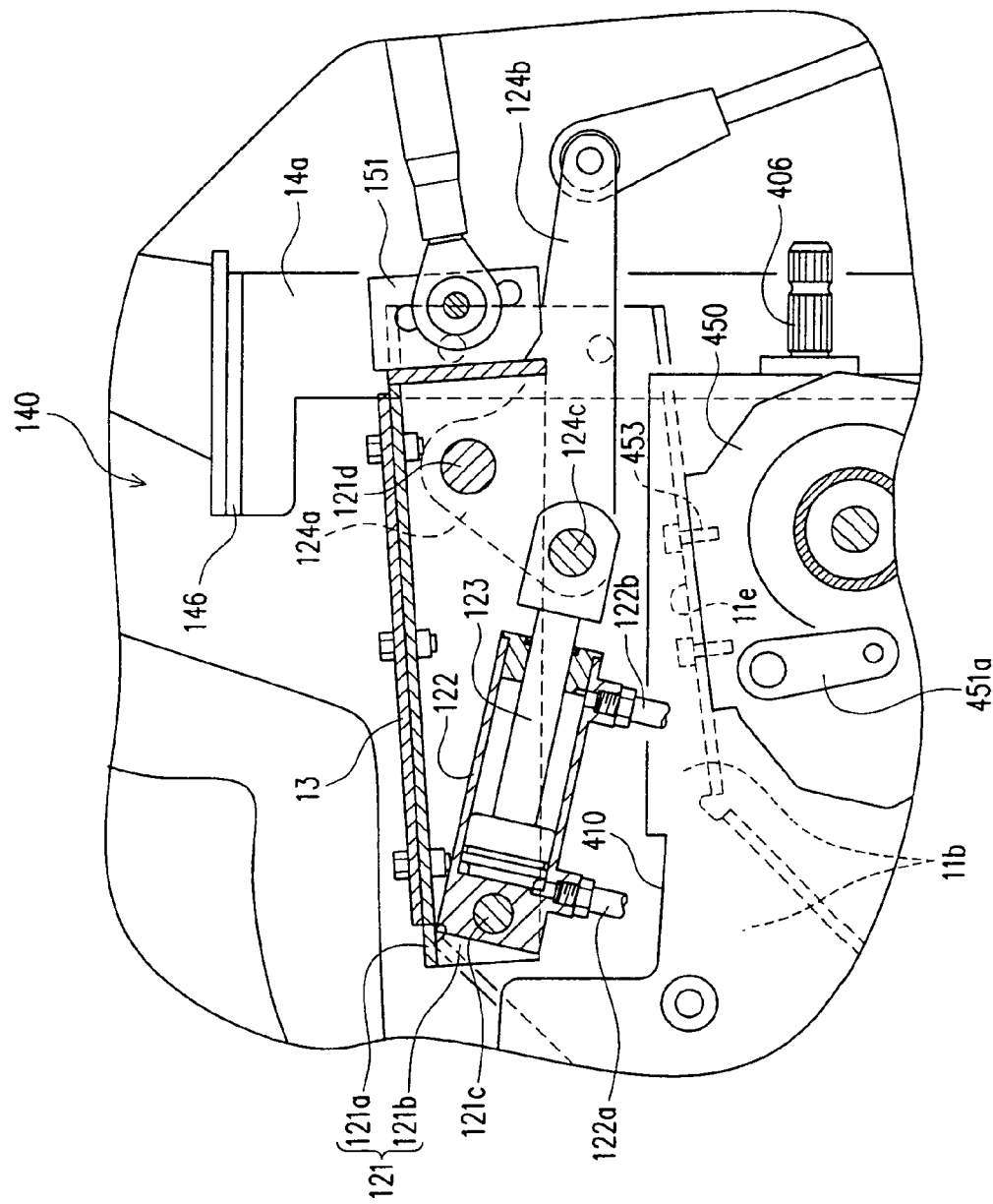
FIG. 9 is a side view of the hydraulic lift unit and its proximity in the working vehicle of FIG. 1.

Now, the description will be made for the hydraulic lift unit 120 and a supporting structure of the hydraulic lift unit 120 by the top plate 13. FIGS. 8 and 9 are respectively plan and side views of the hydraulic lift unit and its proximity with parts illustrated in cross section.

As illustrated in FIGS. 6, 8 and 9, the hydraulic lift unit 120 includes mounting member 121 secured to the top plate 13, single-action or double-action hydraulic cylinder 122 pivotally supported by the mounting member 121, hydraulic piston 123 placed in the hydraulic cylinder 122 so as to be capable of reciprocally moving by the effect of hydraulic pressure, and a pair of lift arms 124 operatively connected with a piston rod of the hydraulic piston 123.

More specifically, the mounting member 121 has top side 121*a* attached to a bottom surface of the top plate 13, and lateral side wall portions 121*b* extending downward from the opposite ends of the top side 121*a* in a vehicle width direction, thus having a U-shape in cross section. The mounting member 121 is formed such as by bending a steel plate. Lift control valve 120*a* of the hydraulic lift unit 120 is attached to the outer side of one of the lateral side wall portions 121*b*. The lift control valve 120*a* is provided with pump port 120*b* for receiving drain fluid from the front-wheel power steering unit 110, and cylinder port 120*c* for supply and discharge of pressurized hydraulic fluid for the hydraulic piston 123 of the hydraulic lift unit 120.

Front-side cross bar 121*c* supported on the lateral side wall portions 121*b* is located on the front side of the mounting member 121. The hydraulic cylinder 122 is pivotally supported on the front-side cross bar 121*c* so as to be positioned between the lateral side wall portions 121*b*. Rear-side cross bar 121*d* supported on the lateral side wall portions 121*b* is located on the rear side of the mounting member 121. The rear-side cross bar 121*d* has opposite ends respectively extending outwards from the lateral side wall portions 121*b* of the mounting member 121, and the pair of lift arms 124 are pivotally supported on these opposite ends.

As illustrated in detail in FIGS. 8 and 9, the pair of lift arms 124 has a substantially V-shape as viewed from the lateral side. More specifically, the pair of lift arms 124 respectively have first pieces 124*a* each having a first end pivotally supported on the rear-side cross bar 121*d* and a second end extending forward and downward from the first end, and second pieces 124*b* extending rearward from the second ends of the first pieces 124*a*.

Connection bar 124*c* is provided for connection between the second ends (apex ends) of the first pieces 124*a* in the pair of lift arms 124, and the piston rod is connected with the connection bar 124*c* substantially at its center in the vehicle width direction. Lift link 150, which is connected with a lower link, a constitutional element of a conventional three-point link hitch mechanism, is at its upper end attached to the rear ends of the second pieces 124*b*. The mounting member 121 is provided at the rear end with hinge 151, to which a top link of the three-point link hitch mechanism is attached.

In FIG. 9, reference numeral 122*a* represents a fluid supply/discharge port of the hydraulic cylinder 122, which port is connected with the cylinder port 120*c* of the lift control valve 120*a* via conduit. Reference numeral 122*b* represents air/leaked fluid drain port of the hydraulic cylinder 122 in an arrangement with the hydraulic cylinder 122 being designated as being of a single action type, which port being connected with an upper air reservoir of the transmission case 410 via conduit.

The above described arrangement of this embodiment, in which the top plate 13 with the hydraulic lift unit 120 attached thereto is detachably secured to the top sides of the pair of main frames 11, produces the following desirable effects.

According to the above arrangement, load generated by lifting the working implement by the hydraulic lift unit 120 is not applied to the transmission case 410 but applied directly to the pair of main frames 11. As a result, it is not necessary to manufacture the transmission case 410 with an increased strength. Also, the top plate 13, which connects the pair of main frames 11 together, serves as a cross member.

In addition, the above arrangement achieves ease of replacement or maintenance of the hydraulic lift unit 120, as well as ease of assembling, since the hydraulic lift unit 120 is previously attached to the top plate 13 so as to have a pre-assembled unit, which can be instantly attached to and detached from the pair of main frames 11. For example, the replacement of the hydraulic cylinder with a high or low volume hydraulic cylinder can be made on a unit-by-unit basis, which means the pre-assembled unit is entirely replaced with a new one constituted by a top plate with a different volume hydraulic cylinder attached thereto without the necessity of paying attention to other parts such as a transmission case.

The vehicle frame 10 is further provided at its first end in the fore and aft direction of the vehicle (the rear end in this embodiment) with support frame 14, which connects between the pair of main frames 11 in order to support a ROPS (Roll-over Protection System).

The ROPS support frame 14 includes a pair of vertical extensions 14a respectively connected with the rear ends of the second horizontal portions 11c of the pair of main frames 11 and upper plate 14b for connection between upper ends of the pair of vertical extensions 14a so that ROPS 140 can be mounted on the upper plate 14b. The pair of vertical extensions 14a may be designed to be capable of supporting thereon lower-link pivotably supporting bar 14c, which extends between the pair of vertical extensions 14a (see FIGS. 1 and 6).

The vehicle frame 10 may include bottom plate 15 for connection between lower ends of the pair of vertical extensions 14a in the ROPS support frame 14. This bottom plate 15 forms a rectangular reinforcing frame in cooperation with the ROPS support frame 14, thereby increasing rigidity of not only the ROPS support frame 14 but also the vehicle frame 10 connected thereto.

Preferably, a tow-bar storage box 15a for supporting a tow bar is attached to the bottom side of the bottom plate 15.

In this embodiment, the bottom plate 15 has a top side to which the transmission case 410 is secured in an attempt to further improve the rigidity of the ROPS support frame 14 and the vehicle frame 10, as well as securely support the transmission case 410.

Now, the description will be made for a speed-change control mechanism of the working vehicle 1 according to this embodiment. A speed-change control circuit diagram of the working vehicle is illustrated in FIG. 10.

Figure 10:
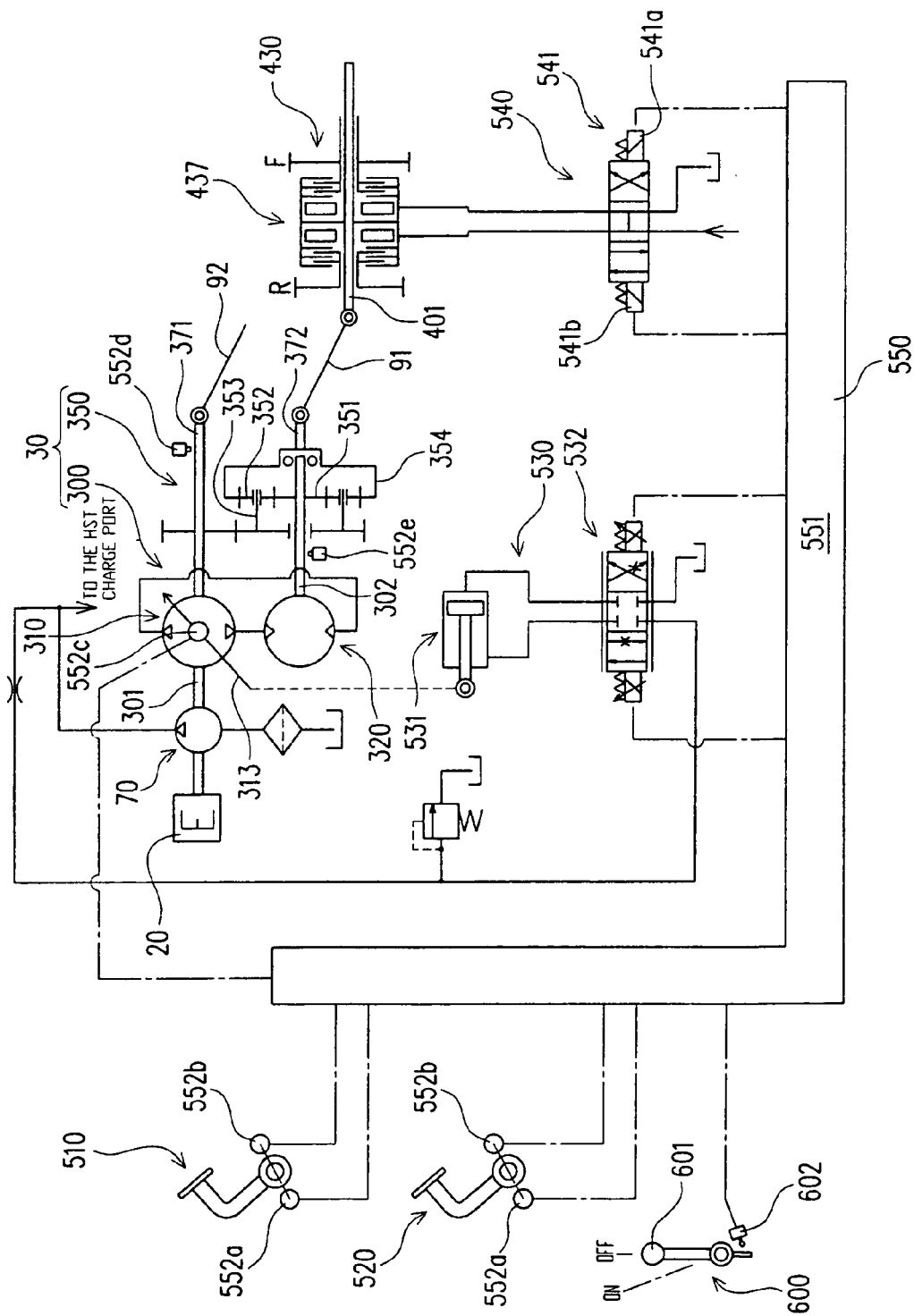
FIG. 10 is a speed-change control circuit diagram of the working vehicle of FIG. 1.

As illustrated in FIG. 10, the speed-change control mechanism of the working vehicle 1 includes forward pedal 510 and back pedal 520, speed-adjusting hydraulic assembly 530 for controlling the slant angle of the output adjustment member 313 of the HST 300, travel-direction changing hydraulic assembly 540 for controlling the forward/rearward travel direction changing unit 430, and control unit 550 for comprehensively controlling the respective units.

The control unit 550 includes control part 551 such as a CPU, and sensor part 552 for detecting and sensing the operational state of each unit or member. In this embodiment, the sensor part 552 includes operation detection sensor 552a for detecting whether each of the forward pedal 510 and the back pedal 520 is under operation based upon the presence or absence of the rotation of a corresponding pedal shaft, operation amount detection sensor 552b such as a potentiometer for detecting the rotational travel distance of the pedal shaft of each pedal (a depressed pedal angle), slant angle detection sensor 552c for detecting the slant angle of the output adjustment member 313 of the HST 300, HST input sensor 552d for detecting the rotational speed of the input shaft 301 of the HST 300 or the PTO output shaft 371 directly connected with this HST input shaft 301, and HST output sensor 552e for detecting the rotational speed of the HST output shaft 302.

The fact whether each of the pedals 510 and 520 has been operated (or depressed) can also be detected based upon the fact whether a signal other than a signal representative of an initial value has been sent from the operation amount detection sensor 552b. That is, the time at which a signal other than the signal representative of an initial value has been sent from the operation amount detection sensor 552b can be regarded as the time at which either of the pedals 510, 520 has been operated. This arrangement can omit the operation detection sensor 552a. The respective pedals are mounted along with return springs (not shown) so that the detection value sent from the respective sensors 552 can be set at zero when the driver has removed the driver's foot from a corresponding pedal.

The speed-adjusting hydraulic assembly 530 includes hydraulic piston unit 531 including a piston operatively connected with the output adjustment member 313 of the HST 300, and solenoid proportional control valve 532 for switching a hydraulic-fluid supply/discharge passage, in which the slant angle of the output adjustment member 313 can be changed or held in the current angle by switching the hydraulic-fluid supply/discharge passage.

That is, a valve body of the solenoid proportional control valve 532 is designed to be capable of taking a first position enabling the HST 300 to have its output with the rotational direction shifted to either forward and reverse direction, a second position enabling the HST 300 to have its output with the rotational direction shifted to the opposite direction, and a neutral position enabling the HST 300 to have its output held in the current state.

As illustrated in FIG. 10, the solenoid proportional control valve 532 receives pressurized hydraulic fluid from the charge pump unit 70. Therefore, the solenoid proportional control valve 532 is preferably mounted in the drive-side unit along with the hydraulic piston unit 531.

The travel-direction changing hydraulic assembly 540 includes solenoid directional control valve 541 for changing a hydraulic-fluid supply/discharge passage of the forward/rearward travel direction changing unit 430 so as to be capable of changing the rotational direction of the running-power output shaft 402 of the transmission 40 from forward to reverse or vice versa, as well as shutting off the power transmission path to the running-power output shaft 402.

That is, a valve body of the solenoid directional control valve 541 is designed to be capable of being shifted to a forward travel position applying pressurized hydraulic fluid to the forward/rearward travel direction changing unit 430 thus enabling the engagement of the power transmission path for the forward travel, a rearward travel position applying pressurized hydraulic fluid to the forward/rearward travel direction changing unit 430 thus enabling the engagement of the power transmission path for the rearward travel, and a neutral position shutting off the power transmission path of the wheel drive train 420. The solenoid directional control valve 541 receives pressurized hydraulic fluid from the sub-pump unit 480.

The thus arranged speed change control mechanism is operated in the following manner.

As described above, the HMT 30 is held in the substantially output shutdown mode during the output adjustment member 313 of the HST 300 is slanted to the maximum slant angle (hereinafter referred to as "initial angle") in either forward or reverse direction, and gradually increases its output as the output adjustment member 313 is slanted in the opposite direction.

In the working vehicle 1 of this embodiment, the above relationship between the output adjustment member 313 and the output of the HMT can be achieved by the following structure.

When the vehicle is stopped with the engine 20 still running and both pedals 510, 520 being out of operation, each sensor 552 detects a value of zero which is then inputted into the control part 551. Based upon the inputted signals, the control part 551 shifts the solenoid proportional control valve 532 to the first position, thereby allowing the speed-adjusting hydraulic assembly 530 to press the output adjustment member 313 toward the initial angle. Once the output adjustment member 313 is detected as having been reached the initial angle, the control part 551 returns the solenoid proportional control valve 532 to the neutral position.

At this moment, the setting of the initial angle of the output adjustment member 313 is adjusted by the calculation of the control part 551 based upon detected signals from the HST input sensor 552*d* and the HST output sensor 552*e* in addition to signals from the slanting angle detection sensor 552*c*. That is, since the rotational speeds respectively inputted into the sun gear 351 and the planetary carrier 353 can be found based upon signals of the HST output sensor 552*e* and the HST input sensor 552*d*, the fact whether the HMT 30 is held in the substantially output shutdown mode can be confirmed by the calculation based upon the set gear ratio of the planetary gear unit 350.

In this embodiment, by the calculation based upon the rotational speed of the HST input shaft 301 and the rotational speed of the HST output shaft 302, a zero power output of the HMT can be confirmed. Alternatively to this, it is possible to provide the HMT output shaft (the running-power output shaft) 372 with a rotation speed sensor. In this regard, it is to be noted that when comparing two different detection manners for detecting the substantially output shutdown mode of the HMT 30, one made by the rotational speed sensor based upon its detected rotational speed of the HMT output shaft 372, and another made by the calculation based upon the rotational speed of the HST input shaft 301 and the rotational speed of the HST output shaft 302, the another one causes less detection error. Therefore, the non-rotation of the HMT output is preferably detected by the calculation based upon the rotational speed of the HST input shaft 301 and the rotational speed of the HST output shaft 302.

Now, the description will be made for the operation to move the working vehicle 1 forward and rearward.

In order to move the working vehicle forward or rearward, the driver selectively presses either the forward pedal 510 or the back pedal 520. For example, assuming that the driver presses the forward pedal 510, the control part 551 detects the start of the pedal operation based upon inputted signals from the operation detection sensor 552*a* or the operation amount detection sensor 552*b*, and then shifts the valve body of the solenoid directional control valve 541 of the travel-direction changing hydraulic assembly 540 to the forward travel position. Whereby, the forward/rearward travel direction changing unit 430 is switched into a forward travel mode enabling engagement of the power transmission path for the forward travel.

As the driver depresses the forward pedal 510 further, the control part 551 controls the solenoid proportional control valve 532 based upon inputted signals from the operation amount detection sensor 552*b*, the slanting angle detection sensor 552*c*, the HST input sensor 552*d* and the HST output sensor 552*e* so as to allow the operational amount of the forward pedal 510, the slant angle of the output adjustment member 313 and the HMT output to have the relationship as shown in FIG. 5.

When the driver has removed pressure from the forward pedal 510 thereby releasing the same from the operational mode, the control part 551 controls the solenoid directional control valve 541 to be held in the current state (that is, a state enabling the valve body of the solenoid directional control valve 541 to be held in the forward travel position.

That is, during the driver presses the forward pedal 510 into the operational mode, the control part 551 excites forward-travel excited solenoid 541*a* of the solenoid directional control valve 541 to have the valve body of the solenoid directional control valve 541 held in the forward travel position. When the driver has removed pressure from the forward pedal 510 and released the same from its depressed state, the control part 551 controls the solenoid directional control valve 541 to keep the forward-travel excited solenoid 541*a* in its excited state.

According to the above arrangement, even when the forward pedal 510 has been taken out of the operational mode, that is, a depressed state while the vehicle travels forward by pressing the forward pedal 510, the power transmission path for the forward travel is held in the engaging state.

Meanwhile, when the forward pedal 510 has been released from the operational mode or depressed state, the HST 300 is changed into the maximum output mode in either forward or reverse direction, while the HMT is forced into a zero output shutdown mode. That is, taking the forward pedal 510 out of the operational mode causes the driving wheels to be brought into operative connection with the running-power output shaft 372, which has been forced into a zero output mode. Whereby, the braking force effected by the HMT 30 is applied to the driving wheels. The braking force of the HMT acts as a resistance force against the rotation of the driving wheels when the vehicle has been stopped, thus preventing the vehicle to unintentionally move. The braking force of the HMT also acts on the driving wheels when the back pedal has been released from its operational mode.

Thus, in the working vehicle 1 of this embodiment, when the forward pedal 510 or the back pedal 520 has been drawn from an inoperative mode into the depressed, operational mode, the forward/rearward travel direction changing unit 430 engages a corresponding power-transmission path. On the other hand, when the forward pedal 510 or the back pedal 520 has been released from the depressed, operational mode, the forward/rearward travel direction changing unit 430 holds the corresponding power-transmission path in its engaged state. Whereby, when the working vehicle has been stopped, the braking force of the HMT is applied to the driving wheels.

Further, the working vehicle 1 of this embodiment includes freewheel mechanism 600 for forcing the forward/rearward travel direction changing unit 430 into the neutral mode when the HMT 30 is in the substantially output shutdown mode. More specifically, the freewheel mechanism 600 includes operation member 601 such as an operation lever provided at the driver's seat, and operation detection sensor 602 for detecting the ON and OFF positions of the operation member 601. With this arrangement, when an ON signal is inputted from the operation detection sensor 602 into the control part 551 during the HMT 30 is in the substantially output shutdown mode, the control part 551 shifts the valve body of the solenoid directional control valve 541 to the neutral position.

Once the valve body of the solenoid directional control valve 541 has been shifted to the neutral position, pressurized hydraulic fluid in the forward/rearward travel direction changing unit 430 is drained, and pressurized hydraulic fluid from the charge pump unit 70 is simultaneously drained. Whereby, the power transmission path of the drive train for the driving wheels is shut off. That is, shifting the valve body of the solenoid directional control valve 541 to the neutral position causes the driving wheels to be brought into a freewheel mode relative to the HMT output shaft 372.

The thus provided freewheel mechanism 600 allows the working vehicle to be easily moved with the engine still running, when the working vehicle is to be forcibly towed or pressed forward or rearward. The fact whether the HMT 30 is in the substantially output shutdown mode can be detected by the calculation of inputted signals from the HST input sensor 552*d* and the HST output sensor 552*e*.

The thus arranged working vehicle 1 produces the following desirable effects.

In the power transmission path for the driving wheels, which extends from the engine 20 to the driving wheels, the HMT 30 that is made up by the combination of the HST 300 and the planetary gear unit 350, and the forward/rearward travel direction changing unit 430 that is connected in tandem with the HMT 30 so as to operatively receive the output of the HMT 30 and change the rotational direction of the output of the HMT are interposed. The HST 300 includes the hydraulic pump unit 310 and the hydraulic motor unit 320, at least one of which is designated as being of the variable displacement type, the pump shaft 301 that is operatively connected with the driving source 20 so as to drive the hydraulic pump unit 310, and the motor shaft 302 adapted to be driven by the hydraulic motor unit 320. Also, the variable output of the HST (hereinafter referred to as "HST variable output") in both the forward and reverse directions is operatively inputted into the second element of the planetary gear unit 350. The HMT 30 is so designed as to be held in the substantially output shutdown mode during the HST variable output is at the maximum level in either forward or reverse direction, and gradually shifted from the substantially output shutdown mode to the maximum output mode as the HST variable output is changed from the maximum output level in the either forward or reverse direction to the maximum output level in the opposite direction.

According to the above arrangement, the entire speed change range available by the HMT 30 can be applied to the speed change range for the forward travel or the speed change range for the rearward travel. Whereby, it is possible to decrease the size of the HST, while widening the speed change range covering both the forward and rearward travels (that is, the difference in absolute value between the maximum forward travel speed and the maximum rearward travel speed).

That is, in a conventional HMT, the forward and reverse rotations of the output of the HMT were achieved by a variable motor output of an HST. More specifically, in the conventional HMT, the output of the HMT in both the forward and reverse directions is produced by changing the variable motor output of the HST from the maximum output level in either forward or reverse direction to the maximum output level in the opposite direction.

With the above conventional arrangement, it is necessary to increase the volume of the HST in order to widen the running speed change range covering both the forward and rearward travels. The increased volume of the HST may invite high cost, increased size and weight of the entire HMT, and hence increased size of a cooling unit.

On the contrary to the above, in this embodiment, as described above, the entire speed change range of the output of the HMT, which is produced by changing the HST variable output from the maximum output level in either forward or reverse direction to the maximum output level in the opposite direction, is taken off as the rotational output to the forward direction and the rearward direction, while the forward/rearward travel direction changing unit 430 is provided on the downstream side of the HMT so as to have the output of the HMT with the rotational direction changed in both the forward and reverse directions by the forward/rearward travel direction changing unit 430 and then transmit the output to the driving wheels.

Therefore, of the running speed change range covering both the forward and rearward travels, a range of which the HST is responsible for can be narrowed, thereby achieving downsizing of the HST. The downsizing of the HST can overcome the aforementioned disadvantages. In addition to that, when the HST 300 constitutes the drive unit with the engine as in this embodiment, the downsizing of the HST 300 is advantageous in downsizing and light-weighting the drive unit, and contributes to a simplified vibration-free support structure for the drive unit.

Also, in the working vehicle 1 of this embodiment, the forward/rearward travel direction changing unit 430 is designed to be capable of being switched into a freewheel mode, which releases the driving wheels from an engaging relationship with the HMT by shutting off the power transmission path for the driving wheels when the HMT 30 is in the substantially output shutdown mode.

The above arrangement omits the necessity to strictly control the precision of the HMT in order to enable the HMT to solely obtain a precise output shutdown mode, and hence achieves ease of manufacturing the HMT. That is, in the conventional arrangement where the output shutdown mode of the HMT is obtained based upon the slant angle of the output adjustment member of the HST, the HMT must be made with high precision. Also, unless the HMT can be switched into the output shutdown mode only by the control of the output adjustment member of the HST, a clutch must be separately located on the downstream side of the HMT so as to shut off the running power transmission path.

On the contrary to the above conventional arrangement, in this embodiment, the freewheel mode can be obtained by utilizing the forward/rearward travel direction changing unit 430 located on the downstream side of the HMT 30, thus omitting the necessity to obtain a precise output shutdown mode solely by the HMT. Therefore, the HMT 30 can be relatively easily manufactured. Since the freewheel mode can be obtained by utilizing the forward/rearward travel direction changing unit 430, it is possible to produce the clutching function, while minimizing the number of parts to be additionally prepared.

This embodiment is so constructed that the forward/rearward travel direction changing unit 430 is switched into the freewheel mode when an operating signal has been inputted from the outside via the operation member 601.

Alternatively to this, it is possible to employ the arrangement where the forward/rearward travel direction changing unit 430 is automatically switched into the freewheel mode when the HMT 30 has been switched into the substantially output shutdown mode.

Figure 11:
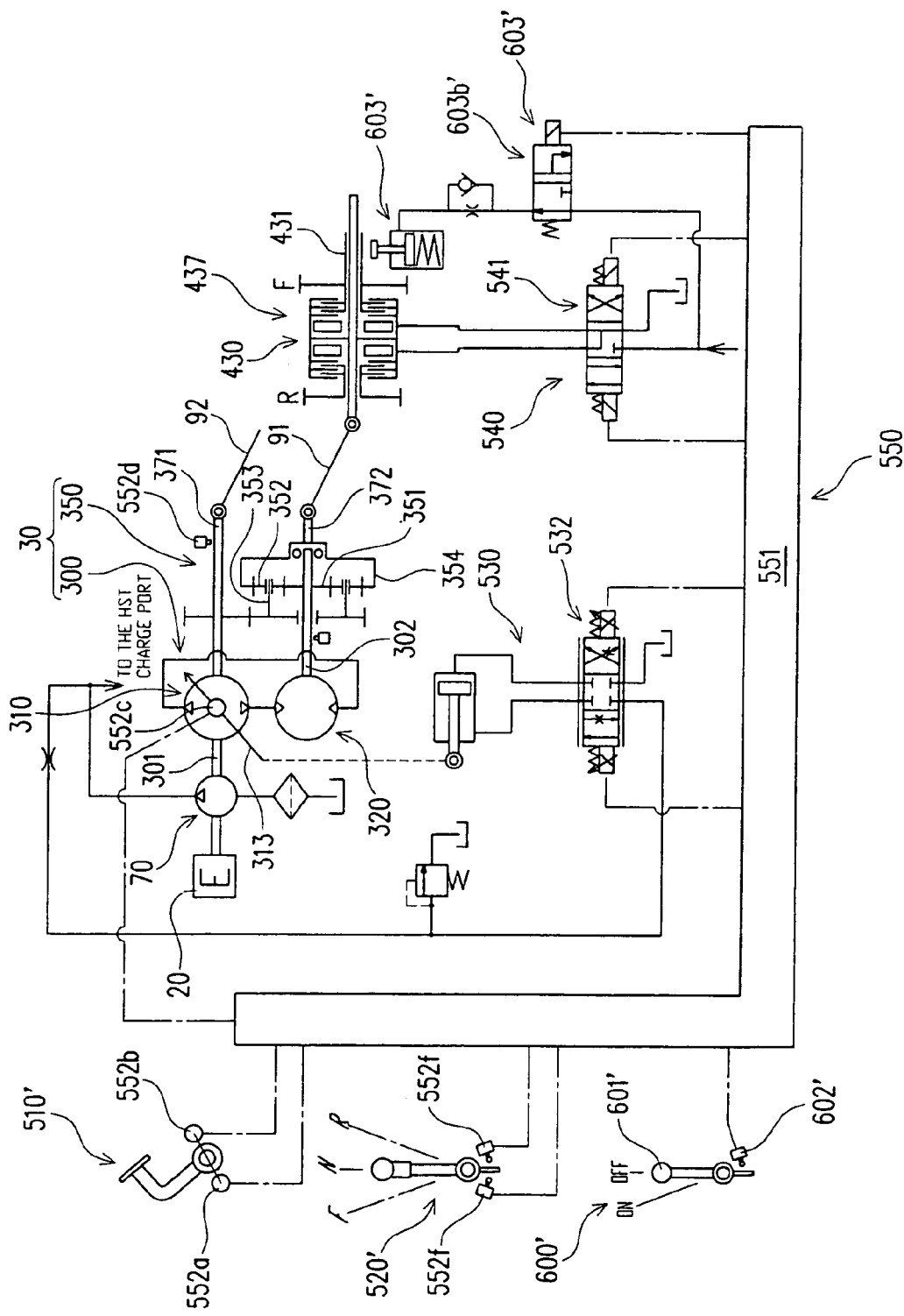
FIG. 11 is the speed-change control circuit diagram employing a control method different from that of FIG. 10.

FIG. 11 illustrates one example of a speed-change control circuit of the working vehicle, which enables the forward/rearward travel direction changing unit 430 to be automatically switched into the freewheel mode when the HMT 30 has been switched into the substantially output shutdown mode. Hereinafter, the description will be made for the working vehicle as illustrated in FIG. 11 mainly with reference to differences relative to this embodiment.

A speed-change control mechanism illustrated in FIG. 11 includes pedal 510' commonly used for the forward and rearward travels (hereinafter simply referred to as "forward and back pedal"), forward/rearward travel direction changing member 520', the speed-adjusting hydraulic assembly 530, the travel-direction changing hydraulic assembly 540, the control unit 550 for comprehensively controlling the respective units, and freewheel mechanism 600'.

The freewheel mechanism 600' is designed to be capable of being switched between a rotation-force application mode enabling rotation resistance to be selectively applied and released relative to the members located on the downstream side of the forward/rearward travel direction changing unit 430, and a freewheel enabling mode enabling the driving wheels to be brought into freewheel state.

More specifically, the freewheel mechanism 600' includes operation member 601' provided at the driver's seat, ON/OFF sensor 602' for detecting ON and OFF of the operation member 601', and hydraulic brake unit 603' capable of being switched into a rotation-resistance-application mode when the operation member 601' is held in an OFF position and a rotation-resistance release mode when the operation member 601' is held in an ON position.

The hydraulic brake unit 603' includes hydraulic piston 603a' adapted to constantly apply braking force to the driven shaft 431 of the forward/rearward travel direction changing unit 430 by means of an urging member, and brake switching valve 603b' for switching a hydraulic fluid supply/discharge passage of the hydraulic piston, so that the aforesaid rotation resistance is released when pressurized hydraulic fluid has been supplied into the hydraulic piston 603a'.

The brake switching valve 603b' is controlled by the control part 551 in such a manner as to be securely held in a rotation-resistance release position enabling pressurized hydraulic fluid to be supplied to the hydraulic piston 603a' when the operation member 601' is held in the ON position, and be capable of selectively taking the rotation-resistance release position and the rotation-resistance application position in association with the forward and back pedal 510' and the forward/rearward travel direction changing member 520' when the operation member 601' is held in the OFF position.

That is, when the operation member 601' is held in the ON position, the hydraulic brake unit 603' is held in the rotation-resistance release mode, in which no braking force is applied irrespective of the operational statuses of other operation members. On the other hand, when the operation member 601' is held in the OFF position, the hydraulic brake unit 603' is held in the rotation-resistance-application mode, in which rotation resistance is selectively applied and released according to the operational statuses of the other operation members.

The thus arranged speed-change control mechanism is operated in the following manner.

First, the description will be made for the case when the operation member 601' is held in the OFF position. When the forward and back pedal 510' is in the inoperative mode, the control part 551 controls the solenoid directional control valve 541 and the hydraulic brake unit 603b' so that the valve body of the solenoid directional control valve 541 is held in the neutral position and the valve body of the brake switching valve 603b' is held in the rotation resistance application position.

Once the driver shifts the forward/rearward travel direction changing member 520' to the forward travel position or the rearward travel position, and then presses the forward and back pedal 510', the control part 551 controls the solenoid directional control valve 541 and the brake switching valve 603b' so as to shift the valve body of the solenoid directional control valve 541 to the forward travel position or the rearward travel position, and shift the brake switching valve 603b' to the rotation-resistance release position, as well as controls the solenoid proportional control valve 532 so as to produce the HMT output corresponding to the operation amount of the forward and back pedal 510'. Whereby, it is possible to produce a vehicle running speed corresponding to the operation amount of the forward and back pedal 510' in a direction selected by the forward/rearward travel direction changing member 520'. The position detection of the forward/rearward travel direction changing member 520' is performed based upon signals from switching-member position sensor 552.

When the driver has removed pressure from the forward and back pedal 510', thus releasing the same from the operational mode, the control part 551 controls the solenoid proportional control valve 532 so as to switch the HMT 30 into the substantially output shutdown mode, as well as controls the solenoid directional control valve 541 and the brake switching valve 603b' so as to shift the valve body of the solenoid directional control valve 541 to the neutral position irrespective of the position of the forward/rearward travel direction changing member 520' and shift the brake switching valve 603b' to the rotation-resistance application position.

That is, in the embodiment as illustrated in FIG. 11, assuming that the operation member is held in the OFF position, when the driver starts the vehicle by shifting the forward/rearward travel direction changing member 520' into either the forward travel position or rearward travel position and then pressing the forward and back pedal 510', the forward/rearward travel direction changing unit 430 is switched into a power transmission mode and the hydraulic brake unit 603' is switched into the rotation-resistance release mode.

Then, when the driver releases pressure from the forward and back pedal 510' so as to switch the HMT 30 into the substantially output shutdown mode, the forward/rearward travel direction changing unit 430 is switched into the power shutdown mode and the hydraulic brake unit 603' is switched into the rotation-resistance-application mode in automatic manner irrespective of the engaging position of the forward/rearward travel direction changing member 520'.

Now, the description will be made for the case when the operation member 601' is held in the ON position in the arrangement as illustrated in FIG. 11.

In the arrangement of FIG. 11, when the operation member 601' is held in the ON position, the control part 551 interprets it as "the driver has displayed the driver's intention not to run the vehicle", and automatically switch the forward/rearward travel direction changing unit 430 into the neutral mode based upon the substantially output shutdown mode of the HMT 30, irrespective of the operational status of the forward/rearward travel direction changing member 520'.

As described above, when the operation member 601' is held in the ON position, the hydraulic brake unit 603' is held in the rotation-resistance release mode. Accordingly, when the forward/rearward travel direction changing unit 430 is switched into the neutral mode, the driving wheels are brought into freewheel state, enabling themselves to be freely rotated.

Figure 12:
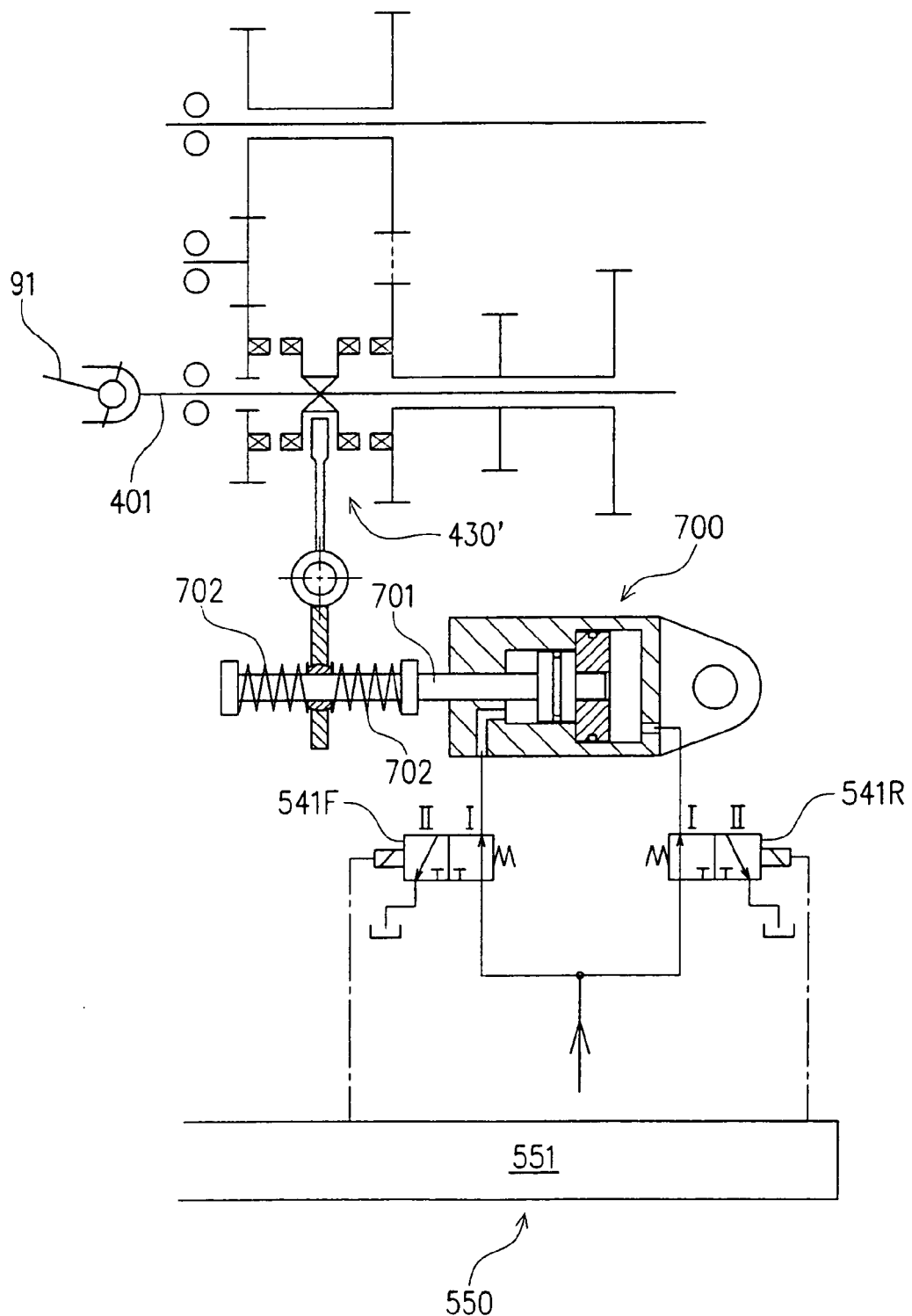
FIG. 12 is a part of a hydraulic circuit diagram of a forward/rearward travel switching unit according to another embodiment of the present invention.

While this embodiment has been described by taking for example the case where the forward/rearward travel direction changing unit 430 is of a hydraulic clutch type, it is possible to employ forward/rearward travel direction changing unit 430', which is of either a collar shift type or a drag clutch type, as illustrated in FIG. 12.

In the embodiment illustrated in FIG. 12, the single solenoid directional control valve 541 is replaced by forward-travel switching valve 541F and rearward-travel switching valve 541R. Both the switching valves 541F, 541R respectively have output ports connected with hydraulic fluid input ports of outside-mounted, double-expansion hydraulic cylinder 700. With this arrangement, when both the switching valves 541F, 541R are held in pressurized-fluid supply position (position I in FIG. 12), the forward/rearward travel direction changing unit 430' is switched into the neutral mode.

When the forward-travel switching valve 541F is held in the pressurized-fluid supply position (position I) and the rearward-travel switching valve 541R is held in a pressurized-fluid discharge position (position II), the hydraulic cylinder 700 is contracted so as to shift piston 701 to the right hand side of the sheet, thereby switching the forward/rearward travel direction changing unit 430' into the rearward travel mode.

On the contrary, when the forward-travel switching valve 541F is held in the pressurized-fluid discharge position (position II) and the rearward-travel switching valve 541R is held in the pressurized-fluid supply position (position I), the hydraulic cylinder is expanded so as to shift the piston 701 to the left hand side of the sheet, thereby switching the forward/rearward travel direction changing unit 430' into the forward travel mode. Reference numeral 702 in FIG. 12 represents a spring for constantly pressing clutch shifter 431' to an engaging side by storing operation force of the piston 701, in preparation for incomplete clutch engagement.

Second Embodiment

Figure 13:
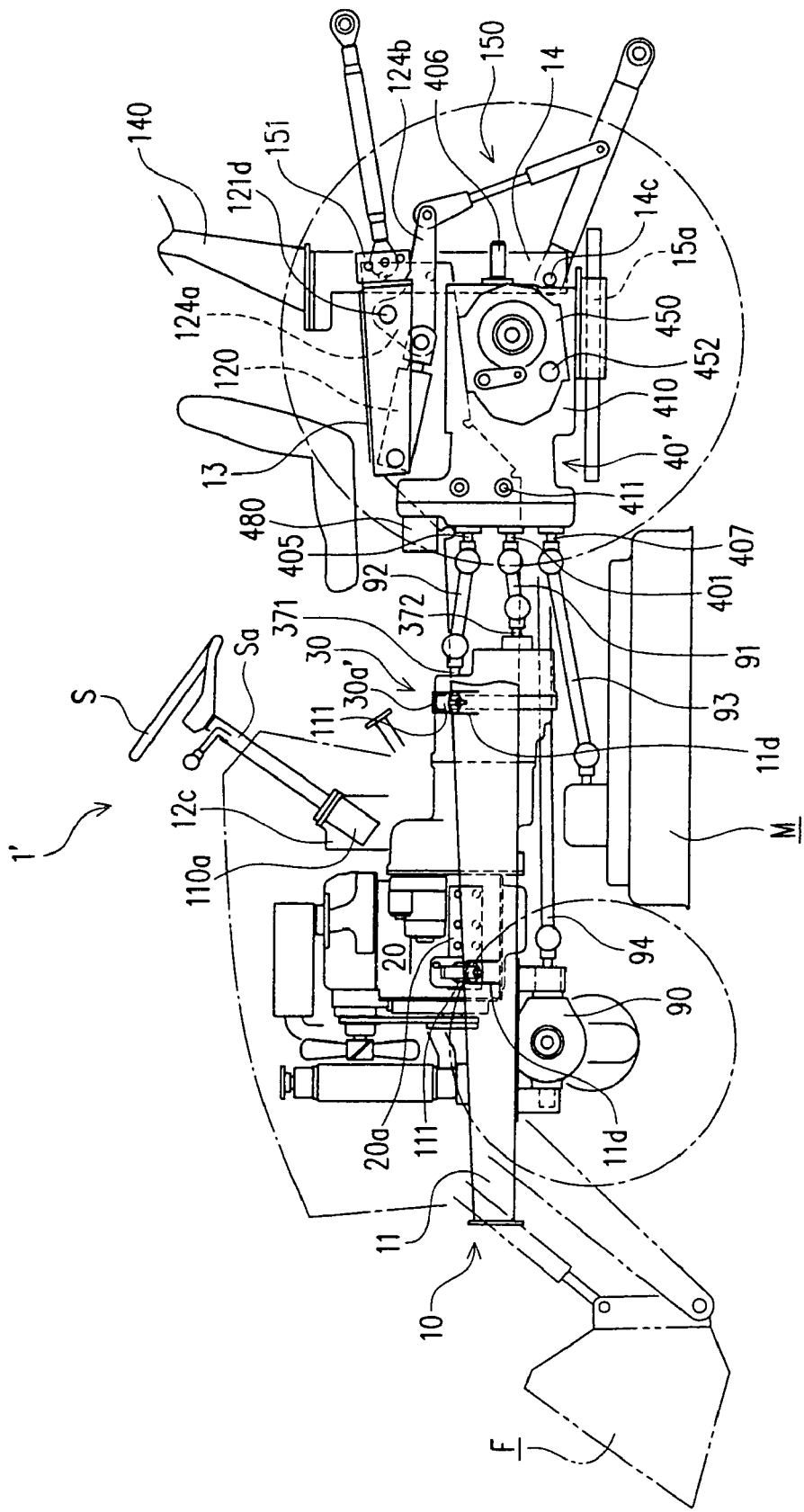
FIG. 13 is a schematic side view of the working vehicle according to still another embodiment of the present invention.
Figure 14:
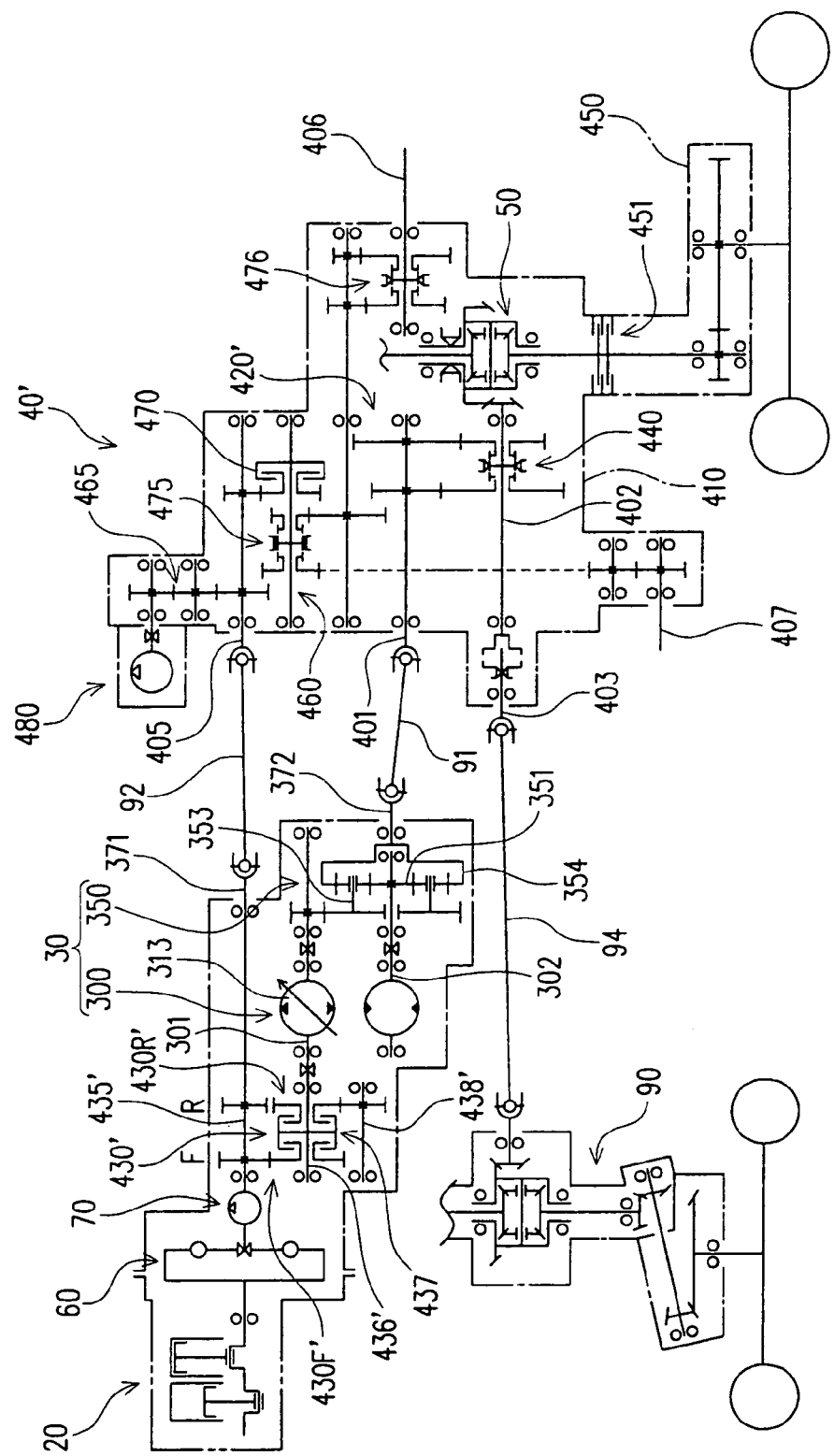
FIG. 14 is a model view of a power transmission path of the working vehicle as illustrated in FIG. 13.

The description will be made for the second embodiment of the present invention with reference to the accompanied drawings. FIGS. 13 and 14 are respectively a schematic side view of working vehicle 1' according to this embodiment and a model view of the power transmission path.

In the following description, corresponding or identical parts to those of the first embodiment have been given the same reference characters or those with primes (') to omit a detailed description thereof.

As illustrated in FIG. 14, the working vehicle 1' of this embodiment includes the forward/rearward travel direction changing unit 430' interposed between the driving source 20 and the HMT 30 in place of the forward/rearward travel direction changing unit 430 provided within the transmission 40 in the first embodiment.

Specifically, the working vehicle 1' includes the vehicle frame 10, the engine 20 supported on the vehicle frame 10 closer to the first side thereof relative to the fore and aft direction of the vehicle in vibration free manner, the HMT 30 serving as a main-speed change unit for changing the speed of drive power from the engine and transmitting the same to a downstream member, transmission 40' for driving the drive axle upon receiving output of the HMT 30, and the forward/rearward travel direction changing unit 430' interposed between the driving source 20 and the HMT 30.

Figure 15:
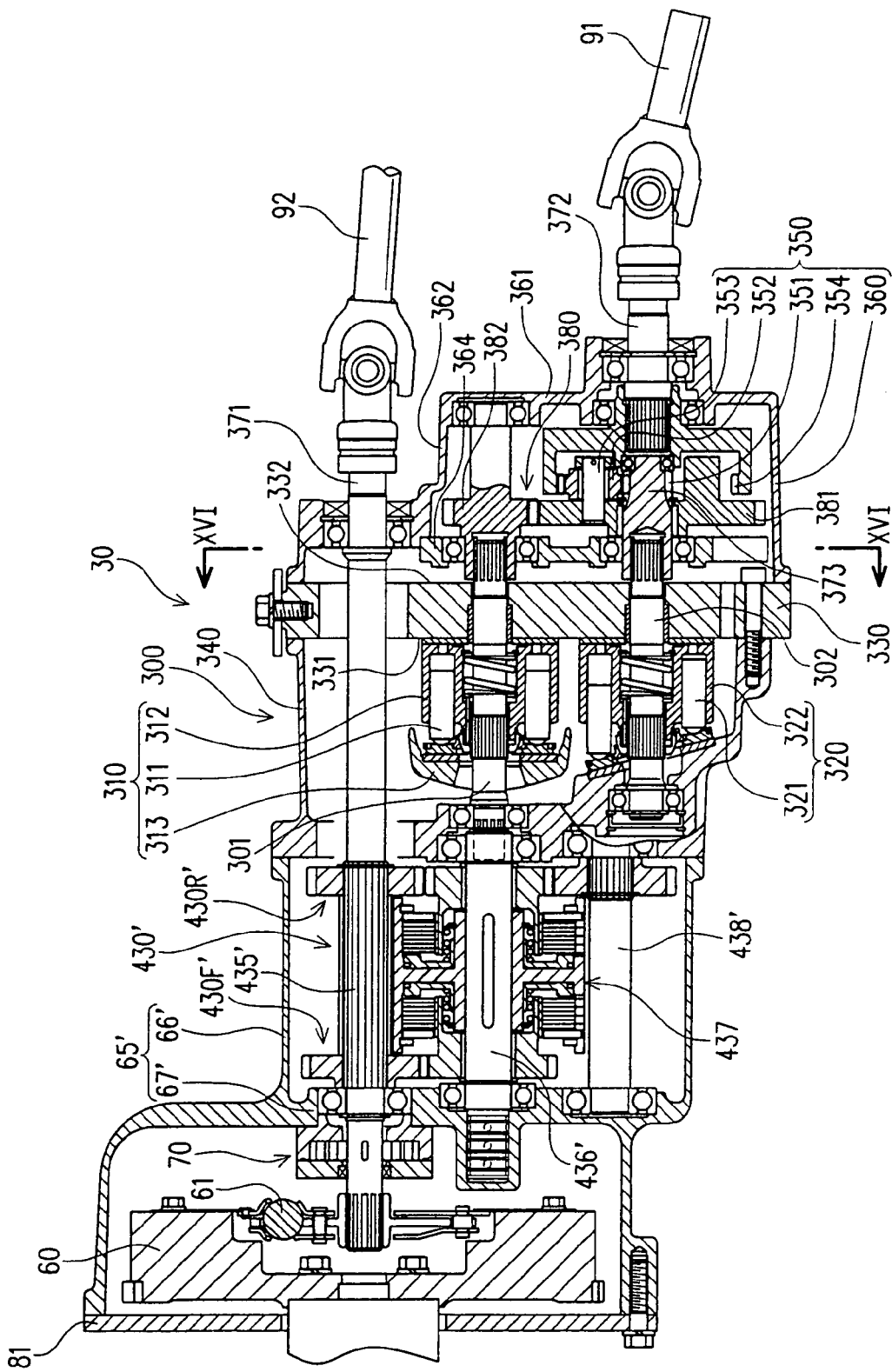
FIG. 15 is a longitudinal cross-sectional side view of the HMT and its proximity in the working vehicle of FIG. 13.

FIG. 15 is a longitudinal cross-sectional side view of the HMT 30 and its proximity in the working vehicle 1'.

As illustrated in FIGS. 14 and 15, the forward/rearward travel direction changing unit 430' includes drive shaft 435' connected with the flywheel 60 preferably via damper 61, driven shaft 436' located substantially in parallel with the drive shaft 435', forward-travel power transmission path 430F' for transmitting power from the drive shaft 435' to the driven shaft 436' when in the forward travel, rearward-travel power transmission path 430R' for transmitting power from the drive shaft 435' to the driven shaft 436' when in the rearward travel, and hydraulically actuated clutch 437 interposed between the forward-travel power transmission path 430F' and the rearward-travel power transmission path 430R'.

In this embodiment, the forward/rearward travel direction changing unit 430' is placed within flywheel housing 65 located between the engine 20 and the HST case 340.

That is, the working vehicle 1' includes the flywheel housing 65' in place of the HMT mounting member 80. The flywheel housing 65' includes hollow body 66' having an upstream side connected with the mounting flange 81 and a downstream side connected with the HST case 340, and bearing wall 67' provided substantially in the center area of the hollow body 66' in the power transmission direction. The hollow body 66' has an upstream open end for receiving the flywheel 60 and a downstream open end for receiving the forward/rearward travel direction changing unit 430'.

In the thus arranged flywheel housing 65', the hollow body 66' defines a dry flywheel housing and a fluid-filled forward/rearward-travel-direction-changing-unit housing respectively in the upstream side and the downstream side thereof with the bearing wall 67' therebetween. In this embodiment, the charge pump unit 70 is placed within the flywheel housing in such a manner as to be rotatable by the drive shaft 435'. It is to be noted that the charge pump unit 70 can be driven by any other shaft, or any other pump can also be functioned as the charge pump.

The drive shaft 435' is bearing-supported by the bearing wall 67' and the planetary housing 360. The drive shaft 435' has an upstream end extending through the bearing wall 67' and connected with the flywheel 60, and a downstream end extending downstream through the center section 330 and the planetary housing 360. In this embodiment, the downstream end of the drive shaft 435' constitutes the PTO output shaft 371.

The driven shaft 436' is bearing-supported by the bearing wall 67' and an upstream end surface of the HST case 340 so as to be coaxially aligned with the input shaft (pump shaft) 301. The driven shaft 436' and the input shaft 301 are connected together with their opposite ends abutting each other in such a manner as to be relatively non-rotatable around the axis. That is, drive power is transmitted from the driving source 20 to the input shaft 301 via the driven shaft 436'. It is a matter of course that the speed of drive power may be possibly increased or reduced between the driven shaft 436' and the input shaft 301 according to the specification of the vehicle.

In this embodiment, the fixed gear 382 of the gear train 380 is relatively non-rotatably connected with the HST input shaft 301 so that constant drive power from the driving source 20 can be inputted into the planetary carrier 353 serving as the first element. Reference numeral 438' in FIG. 14 is a counter shaft as a constitutional element of the rearward-travel power transmission path 430R'.

Figure 16:
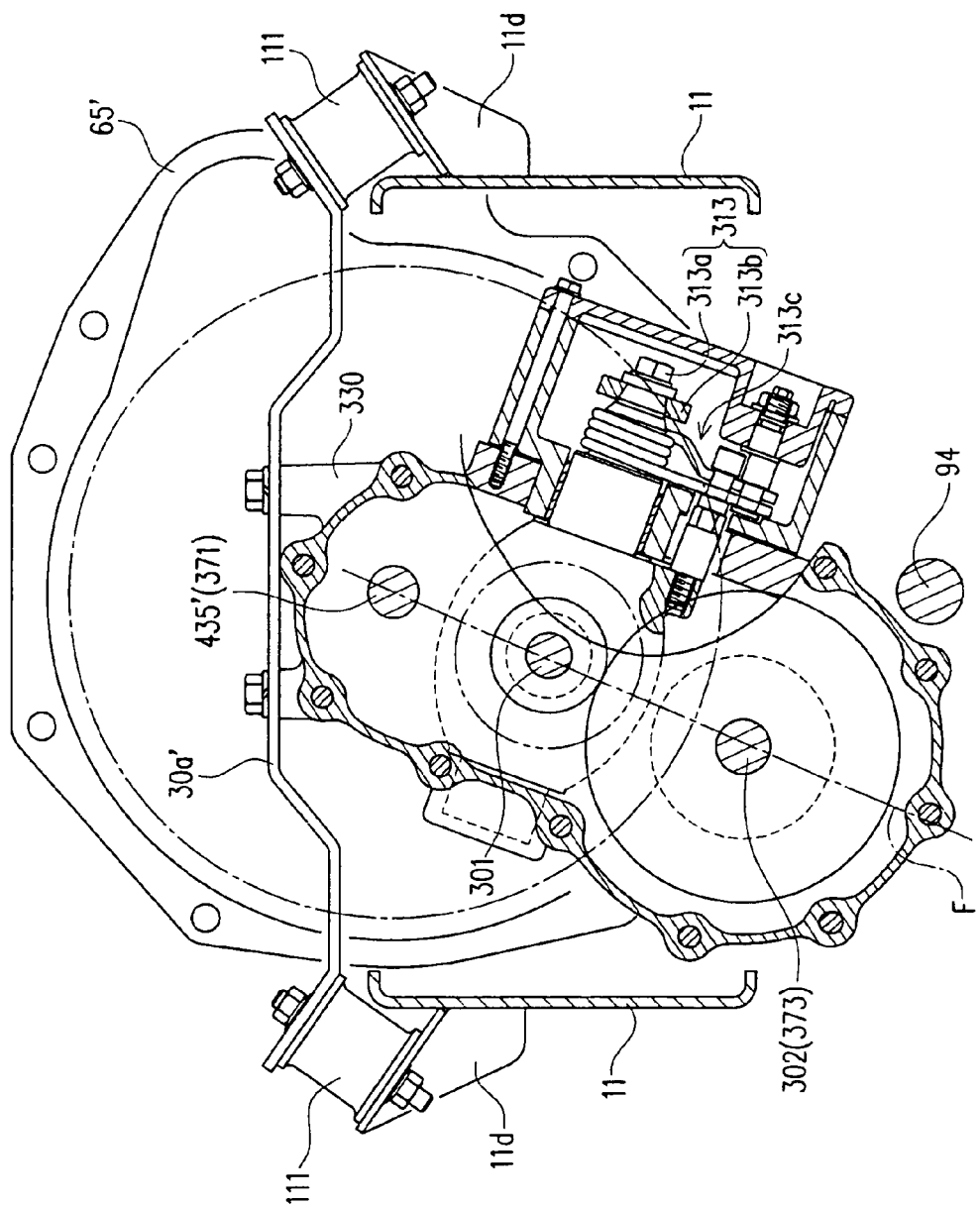
FIG. 16 is a cross section taken along line XVI—XVI in FIG. 15.

FIG. 16 is a cross section taken along line XVI—XVI in FIG. 15. As illustrated in FIG. 16, in this embodiment, the shaft coupling 94 for connection between the front-wheel-driving-power-take-off-shaft 403 and the front axle unit 90 is located substantially in the center of the width of the vehicle so as to locate the pivotal center of the front axle unit 90 substantially in the center of the width of the vehicle. Also, in this embodiment, in order to minimize the vertical length and the horizontal length of the HMT 30, the drive shaft 435' (PTO output shaft 371), the HST input shaft 301 and the HST output shaft 302 (running-power intermediate shaft 373) are placed vertically side by side, while the drive shaft 435' (PTO output shaft 371) is located substantially in the center of the width of the vehicle, allowing imaginary line F extending through the axes of the respective shafts to be inclined to the vertical. Whereby, it is possible to minimize the size of the HMT 30, while preventing an interference with the shaft coupling 94.

Reference numerals 313*a* and 313*b* in FIG. 16 respectively represent a control shaft and a control arm, which together constitute the output adjustment member 313. The control arm 313*b* has a free end operatively connected with the hydraulic piston unit 531. According to this arrangement, the speed-adjusting hydraulic assembly 530 is controlled so as to pivotally move the control arm 313*b*, thereby allowing the control shaft 313*a* to be rotated around the axis and hence the suction/discharge rate of the hydraulic pump unit 310 to be varied. Reference numeral 313*c* in FIG. 16 represents a neutral position return mechanism provided with a neutral position adjustment function.

The hydraulically actuated clutch 437 is designed to be capable of taking a forward-travel position for transmitting power from the drive shaft 435' to the driven shaft 436' via the forward-travel power transmission path 430F', a rearward-travel position for transmitting power from the drive shaft 435' to the driven shaft 436' via the rearward-travel power transmission path 430R', and a neutral position for shutting off the power transmission path from the drive shaft 435' to the driven shaft 436', under the control of a hereinafter described hydraulic circuit.

In the working vehicle 1' having the above arrangement, likewise the first embodiment, it is possible to downsize the HST, while widening the speed change range covering both the forward and rearward travel (that is, the difference in absolute value between the maximum forward travel speed and the maximum rearward travel speed). Also, it is possible to produce a desirable effect that adjustment of the HMT to the zero output can be roughly made.

In addition, in the working vehicle 1', by locating of the forward/rearward travel direction changing unit 430' on the upstream side of the HMT 30, the forward/rearward travel direction changing unit 430' can be further downsized. That is, with this arrangement, the forward/rearward travel direction changing unit 430' receives drive power from the driving source 20 before the speed of the drive power is reduced. Accordingly, it is possible to reduce the load torque applied to the forward/rearward travel direction changing unit 430', thereby achieving the downsizing of the forward/rearward travel direction changing unit 430'.

In the working vehicle 1', as described above, the driving source 20, the forward/rearward travel direction changing unit 430' and the HMT 30 together constitute the driving-side unit that is supported in vibration free manner relative to the vehicle frame 10, and the output from the driving-side unit is inputted into the separately arranged transmission 40' via the shaft couplings 91, 92. That is, in this embodiment, of various running-power transmission parts or members, main parts or members are concentrated in the driving-side unit. With this arrangement, the working vehicle can easily adjust to its new specification only by replacing the driving-side unit with a new one.

In this embodiment, vibration-free support of the driving-side unit on the main frame 11 can be achieved by the brackets 20*a* secured to the crank case (see FIG. 13) and bracket 30*a'* secured to the top side of the center section 330 (see FIGS. 1, 15 and 16), the rubber-cushioned brackets 11*d* secured to the opposite lateral sides of the main frames 11 closer to the front and rear sides thereof, the rubber cushions 111 interposed between the brackets 20*a*, 30*a* and the rubber-cushioned brackets 11*d*. Thus, vibrations of the driving-side unit can be effectively prevented from transmitting to the vehicle frame 10.

Now, the description will be made for the speed-change control circuit of the working vehicle 1' of this embodiment mainly with reference to differences relative to the first embodiment.

Figure 17:
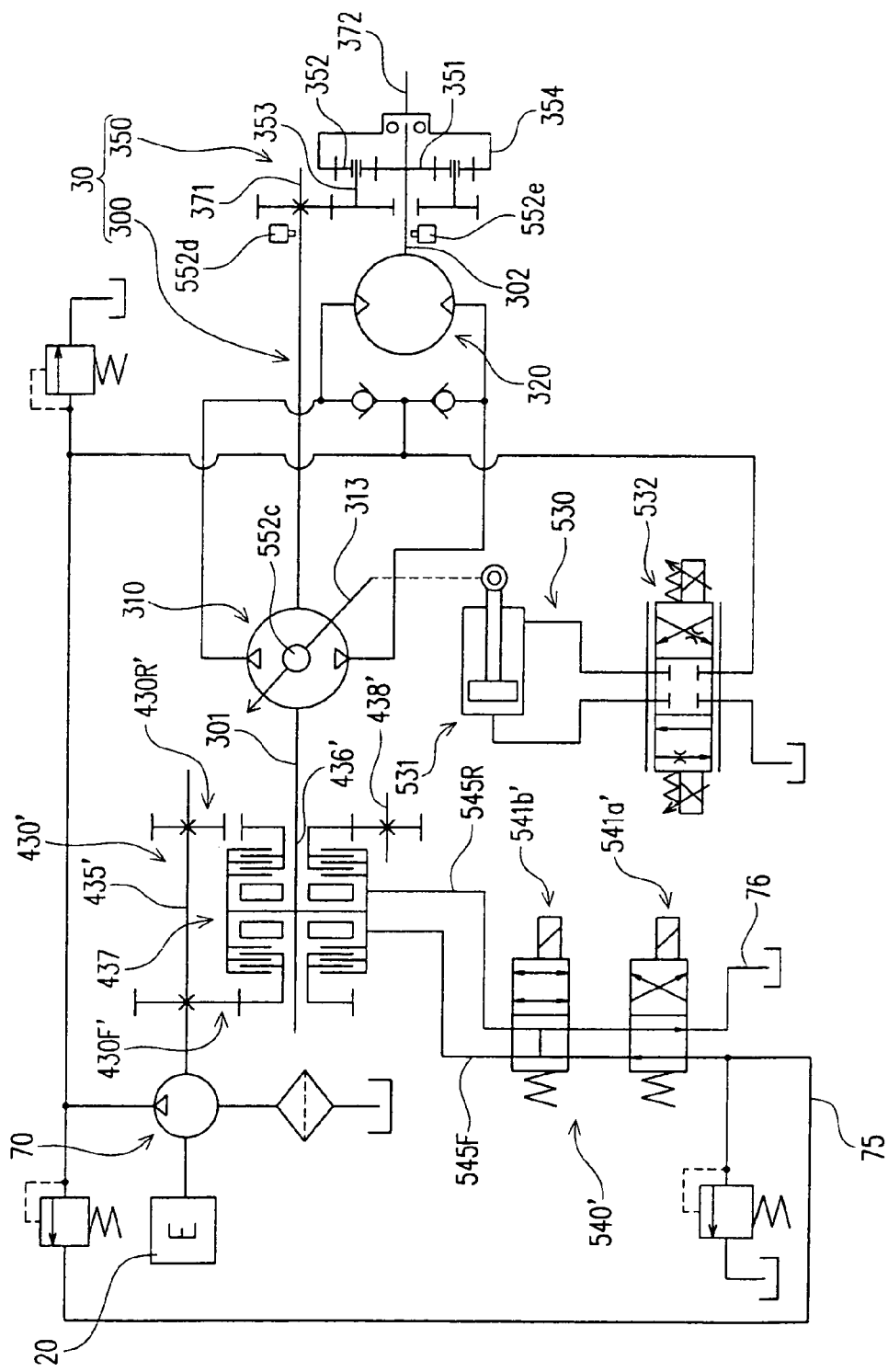
FIG. 17 is a speed change control circuit diagram in the working vehicle of FIG. 13.

FIG. 17 is a speed-change control circuit diagram in the working vehicle 1'. A speed-change control mechanism of the working vehicle 1' includes the forward pedal 510 and the back pedal 520 (not shown), the speed-adjusting hydraulic assembly 530 for controlling the slant angle of the output adjustment member 313 in the HST 300, the travel-direction changing hydraulic assembly 540' for controlling the forward/rearward travel direction changing unit 430', and the control unit 550 (not shown) for comprehensively controlling the respective units. That is, the working vehicle 1' is provided with the travel-direction changing hydraulic assembly 540' in place of the travel-direction changing hydraulic assembly 540 in the first embodiment.

The travel-direction changing hydraulic assembly 540' includes first and second solenoid directional control valves 541*a'*, 541*b'* arranged in tandem in hydraulic fluid supply/discharge passage for the forward travel (hereinafter referred to as "forward-travel hydraulic-fluid supply/discharge passage") 545F and hydraulic fluid supply/discharge passage for the rearward travel (hereinafter referred to as "rearward-travel hydraulic-fluid supply/discharge passage") 545R.

Specifically, the first solenoid directional control valve 541*a'* is designed to be capable of taking an F position enabling the forward-travel hydraulic-fluid supply/discharge passage 545F to be communicated with pressurized-fluid supply passage 75 and the rearward-travel hydraulic-fluid supply/discharge passage 545R to be communicated with drain passage 76, and an R position enabling the rearward-travel hydraulic-fluid supply/discharge passage 545R to be communicated with the pressurized-fluid supply passage 75 and the forward-travel hydraulic fluid supply/discharge passage 545F to be communicated with drain passage 76. In FIG. 17, it is held in the F position.

The second solenoid directional control valve 541*b'* is designed to be capable of taking a release position enabling the forward-travel hydraulic fluid supply/discharge passage 545F, the rearward-travel hydraulic-fluid supply/discharge passage 545R and the pressurized-fluid supply passage 75 to be communicated with the drain passage 76, and a communication position enabling the forward-travel hydraulic-fluid supply/discharge passage 545F and the rearward-travel hydraulic-fluid supply/discharge passage 545R to be respectively brought into states enabling supply of pressurized hydraulic fluid therethrough. In FIG. 17, it is held in the release position.

The first and second solenoid directional control valves 541a', 541b' are controlled by the control part 551 based upon signals from the sensor part 552 in a similar manner as in the first embodiment. That is, for example, once the operation of the forward pedal 510 has been detected by the sensor part 552, the control part 551 shifts the first solenoid directional control valve 541a' to the F position based upon the detected signal from the sensor part 552, and the second solenoid directional control valve 541b' to the communication position.

A control method of the first and second solenoid directional control valves 541a', 541b' is shown in the following Table 1.

In Table 1, F-mode, N-mode and R-mode respectively represent the forward travel mode, the neutral mode and the rearward-travel mode determined by the control unit 550 based upon the operational statuses of the forward pedal 510 and the back pedal 520.

TABLE 1

|  | F-Mode | N-Mode | R-Mode |
| --- | --- | --- | --- |
| First Solenoid Directional Control Valve 541a' | F position | F position | R position |
| Second Solenoid Directional Control Valve 541b' | Communication position | Release position | Communication position |

Thus, in this embodiment, when the control unit 550 has determined based upon the operational statuses of the forward pedal 510 and the back pedal 520 that the vehicle travel status lies in N-mode, it switches the forward/rearward travel direction changing unit 430' into a power shutdown mode. Accordingly, the power transmission path to the input shaft 301 is shut down with the result that the HMT 30 is switched into the zero output mode.

Preferably, in the N-mode, a power neutral function is also be provided so as to selectively switch the forward/rearward travel direction changing unit 430' into a power transmission mode. That is, in the control method as shown in TABLE 1, when the forward pedal 510 and the back pedal 520 are in their inoperative modes, the power transmission path from the HMT 30 to the driving wheels are cut off from the driving source 20. Thus, the driving wheels are brought into a freely rotatable state.

The above control method is effective when the working vehicle 1' is forcibly towed or pressed forward or rearward with the engine 20 still running. However, when the working vehicle 1' is to be changed in its travel direction on a slope or the like, the following problem is caused.

That is, every time when the travel direction of the vehicle is changed, the control unit 550 inevitably detects the N-mode. For example, when the mode is switched from the rearward-travel mode to the forward-travel mode, the control unit 550 detects each switching operation for R-mode to N-mode to F-mode. Therefore, when the travel direction of the vehicle is changed in its travel direction such as on a slope, the vehicle 1' may be unintentionally moved downwardly when in the N-mode if the switching operation is made in the control method as shown in TABLE 1.

In consideration of the above, it is possible to develop a so-called power neutral function for example, by operating a power neutral switch provided near the driver's seat. By the power neutral function is meant a function allowing either a power transmission path (the forward-travel power transmission path 430F' or the rearward-travel power transmission path 430R' in this embodiment) to be held in the power transmission mode even when in the N-mode.

TABLE 2 shows a control method when the power neutral function has been developed.

TABLE 2

|  | F-Mode | N-Mode | R-Mode |
| --- | --- | --- | --- |
| First Solenoid Directional Control Valve 541a' | F position | F position | R position |
| Second Solenoid Directional Control Valve 541b' | Communication position | Communication position | Communication position |

In the control method as shown in TABLE 2, even when in the N-mode, the forward/rearward travel direction changing unit 430' is held in the power transmission mode, it is possible to prevent the vehicle from being unintentionally moved downward at the time when the travel direction is switched such as on a slope. TABLE 2 shows the control method allowing the forward-travel power transmission path 430F' to be brought into the power transmission state when in the N-mode.

Figure 18:
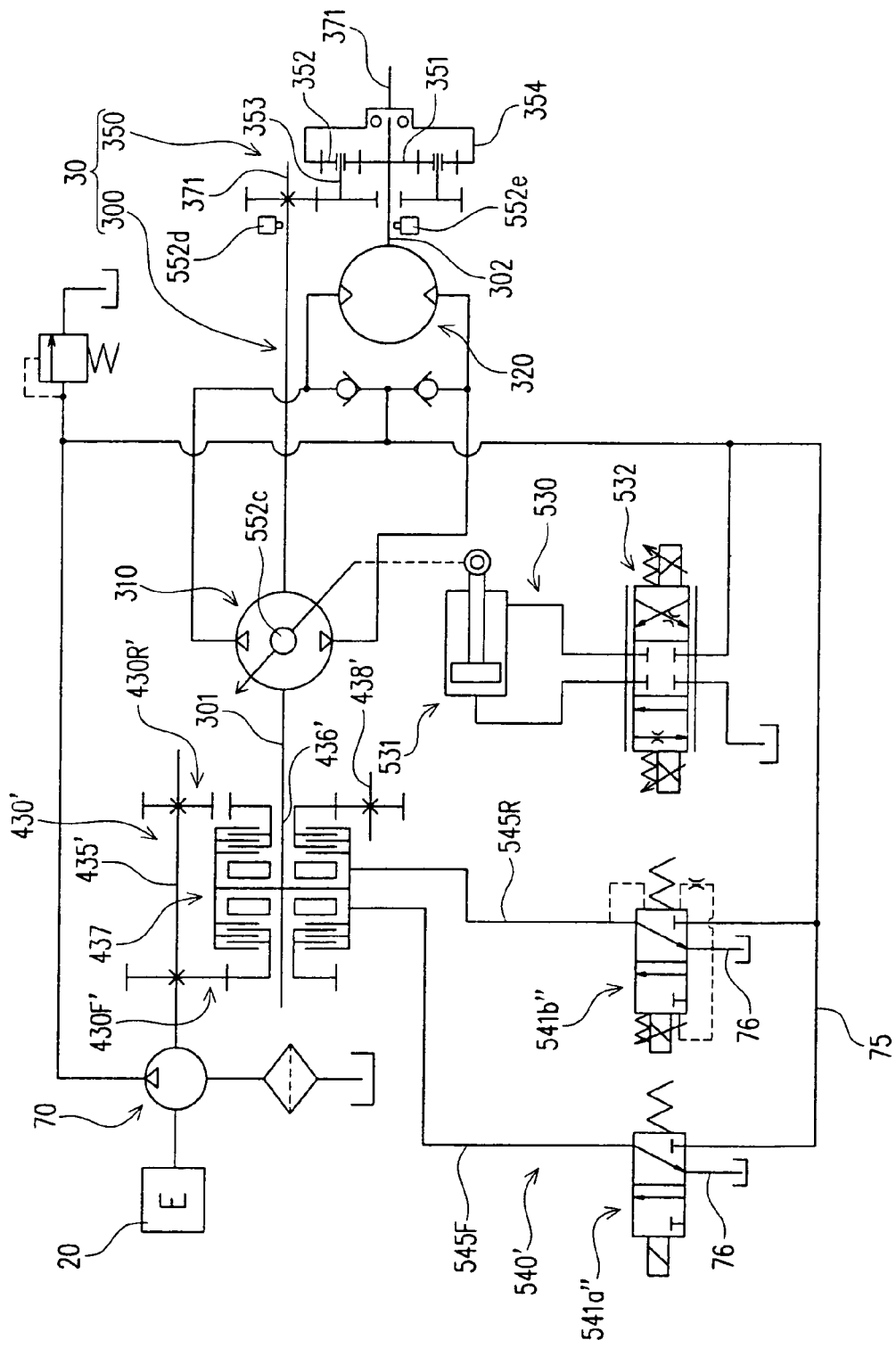
FIG. 18 is another speed change control circuit diagram of the working vehicle as illustrated in FIG. 13.

This embodiment has been described by taking for example the arrangement that the travel-direction changing hydraulic assembly 540' includes the first and second solenoid directional control valves 541a', 541b', which are arranged in tandem in the hydraulic-fluid supply/discharge passages 545F, 545R of the forward/rearward travel direction changing unit 430'. However, the present invention is not necessarily limited to this embodiment. For example, as illustrated in FIG. 18, the travel-direction changing hydraulic assembly 540' may be constructed to include first solenoid directional control valve 541a" arranged in the forward-travel hydraulic-fluid supply/discharge passage 545F and second solenoid directional control valve 541b" arranged in the rearward-travel hydraulic-fluid supply/discharge passage 545R.

The first solenoid directional control valve 541a" is designed to be capable of taking a communication position enabling the forward-travel hydraulic-fluid supply/discharge passage 545F to be brought into communication with the pressurized-fluid supply passage 75, and a release position enabling the forward-travel hydraulic-fluid supply/discharge passage 545F to be brought into communication with the drain passage 76. In FIG. 18, it is held in the release position.

The second solenoid directional control valve 541b" is designed to be capable of taking a communication position enabling the rearward-travel hydraulic-fluid supply/discharge passage 545R to be brought into communication with the pressurized-fluid supply passage 75, and a release position enabling the rearward-travel hydraulic-fluid supply/discharge passage 545R to be brought into communication with the drain passage 76. In FIG. 18, it is held in the release position. The second solenoid directional control valve 541b" is preferably a proportional solenoid valve so that rapid hydraulic pressure increase in the rearward-travel hydraulic-fluid supply/discharge passage 545R can be prevented.

TABLE 3 shows a method of controlling the first and second solenoid directional control valves 541a", 541b".

TABLE 3

| Power Neutral Function | | F-Mode | N-Mode | R-Mode |
|---|---|---|---|---|
| OFF | First solenoid directional control valve 541a" | Communication position | Release position | Release position |
| | Second solenoid directional control valve 541b" | Release position | Release position | Communication position |
| ON | First solenoid directional control valve 541a" | Communication position | Communication position | Release position |
| | Second solenoid directional control valve 541b" | Release position | Release position | Communication position |

Thus, the same effect can also be produced by the embodiment as illustrated in FIG. 18.

It is a matter of course that, in this embodiment, the forward pedal 510 and the back pedal 520 can be replaced with the forward and back pedal 510' and the forward/rearward travel direction changing member 520' in the same manner as in the first embodiment.

According to the working vehicle of the one embodiment, in which the variable output HST and the planetary gear unit are connected with the engine, which is supported on the vehicle frame closer to either side of the fore and aft direction of the vehicle in vibration-free manner, thereby constituting the driving-side unit integrally supported on the vehicle frame in vibration free manner; the transmission case of the transmission is fixedly supported on the vehicle frame closer to the opposite side of the fore and aft direction of the vehicle with a distance to the driving-side unit; and an output element of the planetary gear unit is operatively connected with the wheel drive train of the transmission via the shaft coupling extending along the fore and aft direction of the vehicle, it is possible to expand the speed change range of the drive axle and/or reduce load applied to the speed change mechanism, as well as secure a free space between the front and rear wheels while effectively limiting expansion of the vehicle's length.

When the shaft coupling is of a vibration absorbing type, it is possible to effectively prevent vibrations from the engine, the main-speed change unit or the like from transmitting to the transmission, the axle or the like, and hence prevent the driver from feeling discomfort due to vibrations.

According to the working vehicle of another embodiment, in which the vehicle frame is made up by the pair of main frames that extend in the fore and aft direction of the vehicle on the opposite lateral sides thereof and the cross member disposed to straddle over the top sides of the main frames; and the hydraulic lift unit for moving the attached working implement relative the vehicle frame is suspended and supported by the cross member, load generated during the working implement is moved can be supported by the vehicle frame. As a result, it is possible to omit the necessity to make the transmission case or any other members more strengthened than they are originally required, and therefore achieve lowered costs of the transmission case and other members.

With the above arrangement, it is also possible to perform replacement or repair of the hydraulic lift unit without an influence on the transmission case or any other members.

According to the working vehicle of still another embodiment, which has the power transmission path extending from the driving source to the driving wheels for driving the wheels equipped with the variable output HMT and the forward/rearward travel direction changing unit arranged in tandem therein, in which the HMT is designed to be held in the substantially output shutdown mode when the HST variable output is at the maximum output level in either forward or reverse direction and switched from the substantially output shutdown mode to the maximum output mode as the HST variable output is changed from the maximum output level in the either forward or reverse direction to the maximum output level in the opposite direction, while the forward/rearward travel direction changing unit is designed to shut off the power transmission path during the HMT is held in the substantially output shutdown mode, thereby enabling the driving wheels to be brought into freewheel state, it is possible to expand the running speed change range while minimizing the size of the HST, as well as easily producing freewheel state of the driving wheels.

By locating the forward/rearward travel direction changing unit located on the upstream side of the HMT, the volume of the forward/rearward travel direction changing unit can be reduced. Also, the arrangement, in which the driving source, the forward/rearward travel direction changing unit and the HMT together constitute the driving-side unit that is supported in vibration free manner relative to the vehicle frame, enables the working vehicle to be easily adjusted to a new specification of the vehicle.

This specification is by no means intended to restrict the present invention to the preferred embodiments set forth therein. Various modifications to the working vehicle as described herein, may be made by those skilled in the art without departing from the spirit and scope of the present invention as defined in the appended claims.

What is claimed is:

1. A working vehicle comprising an HMT made up by the combination of an HST and a planetary gear unit, and a forward/rearward travel direction changing unit for changing the rotational direction of output of said HMT, said HMT and said forward/rearward travel direction changing unit being arranged in tandem in a power transmission path extending from a driving source to driving wheels, wherein said HST includes a hydraulic pump unit and a hydraulic motor unit, at least one of which being designated as being of a variable displacement type, a pump shaft being operatively connected with said driving source for driving said hydraulic pump unit and a motor shaft being driven by said hydraulic motor unit, wherein an HST variable output in both forward and reverse directions is outputted via said motor shaft;

said HMT is designed to be held in a substantially output shutdown mode when said HST variable output is at a maximum level in either forward or reverse direction, and switched from said substantially output shutdown mode to a maximum output mode as said HST variable output is changed from said maximum output level in said either forward or reverse direction to a maximum output level in the opposite direction;

said forward/rearward travel direction changing unit is designed to be selectively switched into a forward travel mode enabling transmission of said HMT variable output to said driving wheels with the rotational direction of said HMT variable output maintained in a forward direction, a rearward travel mode enabling transmission of said HMT variable output to said driving wheels with the rotational direction of said HMT variable output changed to a reverse direction, and a neutral mode shutting off said power transmission path; and said working vehicle is capable of selecting (a) a normal operation state, in which said forward/rearward travel direction changing unit is switched into respectively said forward travel mode, said rearward travel mode and said neutral mode when a traveling operation member is shifted into a forward travel position, a rearward travel position and a neutral position by a driver, or (b) a power neutral operation state, in which said forward/rearward travel direction changing unit is switched into respectively said forward travel mode and said rearward travel mode when said traveling operation member is shifted into said forward travel position and said rearward travel position by the driver, and switched into either said forward travel mode or said rearward travel mode when said traveling operation member is shifted to said neutral position.

2. A working vehicle according to claim 1 wherein said selection said of said normal operation state or said power neutral operation state is performed by a power neutral operation member by the driver.

* * * * *